(12) United States Patent
Nishinakama

(10) Patent No.: US 12,224,138 B2
(45) Date of Patent: Feb. 11, 2025

(54) INPUT DEVICE AND MOVABLE OBJECT

(71) Applicant: Panasonic Intellectual Property Management Co., Ltd., Osaka (JP)

(72) Inventor: Hideki Nishinakama, Fukui (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 352 days.

(21) Appl. No.: 17/666,217

(22) Filed: Feb. 7, 2022

(65) Prior Publication Data

US 2022/0165525 A1 May 26, 2022

Related U.S. Application Data

(63) Continuation of application No. PCT/JP2020/029618, filed on Aug. 3, 2020.

(30) Foreign Application Priority Data

Sep. 19, 2019 (JP) .................................. 2019-170753

(51) Int. Cl.
*H01H 36/00* (2006.01)
(52) U.S. Cl.
CPC .................................. *H01H 36/008* (2013.01)
(58) Field of Classification Search
CPC .................................................. H01H 36/008
USPC ......................................................... 335/205
See application file for complete search history.

(56) References Cited

U.S. PATENT DOCUMENTS

| | | | |
|---|---|---|---|
| 6,606,085 B1* | 8/2003 | Endo | G06F 3/038 345/161 |
| 6,659,630 B2* | 12/2003 | Becker | B60Q 1/1461 362/802 |
| 7,352,174 B1* | 4/2008 | Lee | G01D 5/25 335/206 |
| 8,022,796 B2* | 9/2011 | Deininger | B60R 25/04 335/207 |
| 10,626,914 B2* | 4/2020 | Nishinakama | H03K 17/97 |

(Continued)

FOREIGN PATENT DOCUMENTS

| | | |
|---|---|---|
| JP | 2008-140697 A | 6/2008 |
| JP | 2009-123366 A | 6/2009 |

(Continued)

OTHER PUBLICATIONS

International Search Report and Written Opinion, mailed Oct. 13, 2020, for International Application No. PCT/JP2020/029618, 7 pages.

*Primary Examiner* — Alexander Talpalatski
(74) *Attorney, Agent, or Firm* — Seed IP Law Group LLP

(57) ABSTRACT

An input device includes a permanent magnet, a magnetic sensor, an operating unit, and a conversion mechanism. A movable member is one of the permanent magnet or the magnetic sensor. The conversion mechanism is configured to convert a movement of the operating unit in a first direction into a first action of the movable member and convert a movement of the operating unit in a second direction into a second action of the movable member. The first action is a movement involving a change in a relative angle of rotation of the permanent magnet around a rotation axis relative to the magnetic sensor. The second action is a movement involving a change in the strength of the magnetic field applied to the magnetic sensor.

13 Claims, 14 Drawing Sheets

(56) References Cited

U.S. PATENT DOCUMENTS

| | | | |
|---|---|---|---|
| 2008/0129431 A1 | 6/2008 | Onodera et al. | |
| 2009/0139850 A1 | 6/2009 | Urakawa et al. | |
| 2009/0195338 A1* | 8/2009 | Deininger | B60R 25/04 335/205 |
| 2017/0314610 A1* | 11/2017 | Nishinakama | F16C 11/0604 |
| 2019/0111830 A1* | 4/2019 | Nishinakama | H01H 36/0006 |

FOREIGN PATENT DOCUMENTS

| | | |
|---|---|---|
| JP | 2009-134944 A | 6/2009 |
| JP | 2009-140659 A | 6/2009 |
| JP | 2016-012466 A | 1/2016 |
| JP | 2016-015203 A | 1/2016 |
| WO | 2015/198863 A1 | 12/2015 |
| WO | 2016/002450 A1 | 1/2016 |

* cited by examiner

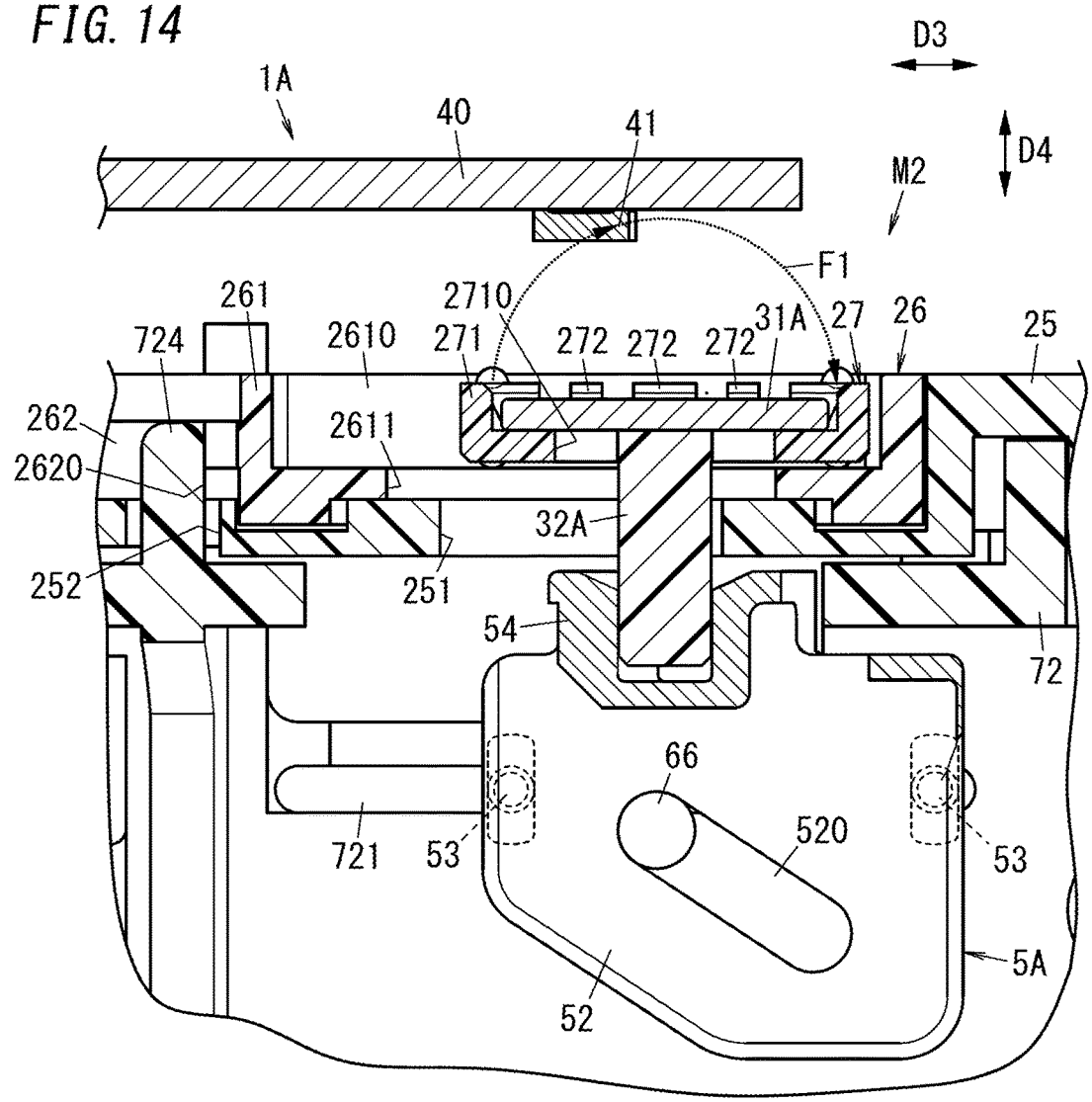

INPUT DEVICE AND MOVABLE OBJECT

TECHNICAL FIELD

The present disclosure generally relates to input devices and movable objects and specifically relates to an input device including a magnetic sensor and a movable object including the input device.

BACKGROUND ART

JP 2016-012466 A describes a lever switching device (an input device) including an operation lever (an operating unit), a magnet (a permanent magnet), and two detectors (magnetic sensors). The operation lever is rotationally movable in a direction of a first rotation operation (a turn operation) around a first rotation axis and a direction of a second rotation operation (a dimmer operation) around a second rotation axis intersecting the first rotation axis. The turn operation and the dimmer operation given to the operation lever cause the magnet to make movements in two directions corresponding to a rotation movement and a sliding movement. The two detectors individually detect the rotation movement and the sliding movement of the magnet. This configuration enables the operations in two directions to be detected while only one magnet is required.

The lever switching device described in JP 2016-012466 A, however, requires both the detector (the magnetic sensor) for detecting the rotation movement of the magnet in response to the turn operation given to the operation lever and the detector for detecting the sliding movement of the magnet in response to the dimmer operation given to the operation lever. This may complicate the structure of the lever switching device.

SUMMARY

It is an object of the present disclosure to provide an input device and a movable object which have a reduced number of magnetic sensors.

An input device according to an aspect of the present disclosure includes a permanent magnet, a magnetic sensor, an operating unit, and a conversion mechanism. The magnetic sensor is configured to detect a magnetic field produced by the permanent magnet. The conversion mechanism is configured to convert a movement of the operating unit into a movement of a movable member which is one of the permanent magnet or the magnetic sensor relative to the other of the permanent magnet or the magnetic sensor. The magnetic sensor is configured to output a signal according to: a relative angle of rotation of the permanent magnet around a rotation axis relative to the magnetic sensor; and strength of a magnetic field applied to the magnetic sensor. The conversion mechanism is configured to convert a movement of the operating unit in a first direction into a first action of the movable member and convert a movement of the operating unit in a second direction intersecting the first direction into a second action of the movable member. The first action is a movement involving a change in the relative angle of rotation of the permanent magnet around the rotation axis relative to the magnetic sensor. The second action is a movement involving a change in the strength of the magnetic field applied to the magnetic sensor.

A movable object according to an aspect of the present disclosure includes the input device and a movable object body. The input device is mounted on the movable object body.

BRIEF DESCRIPTION OF THE DRAWINGS

The figures depict one or more implementation in accordance with the present teaching, by way of example only, not by way of limitations. In the figures, like reference numerals refer to the same or similar elements.

FIG. 14 is a sectional view of the input device of the second variation after being operated.

DETAILED DESCRIPTION

Figure 1:
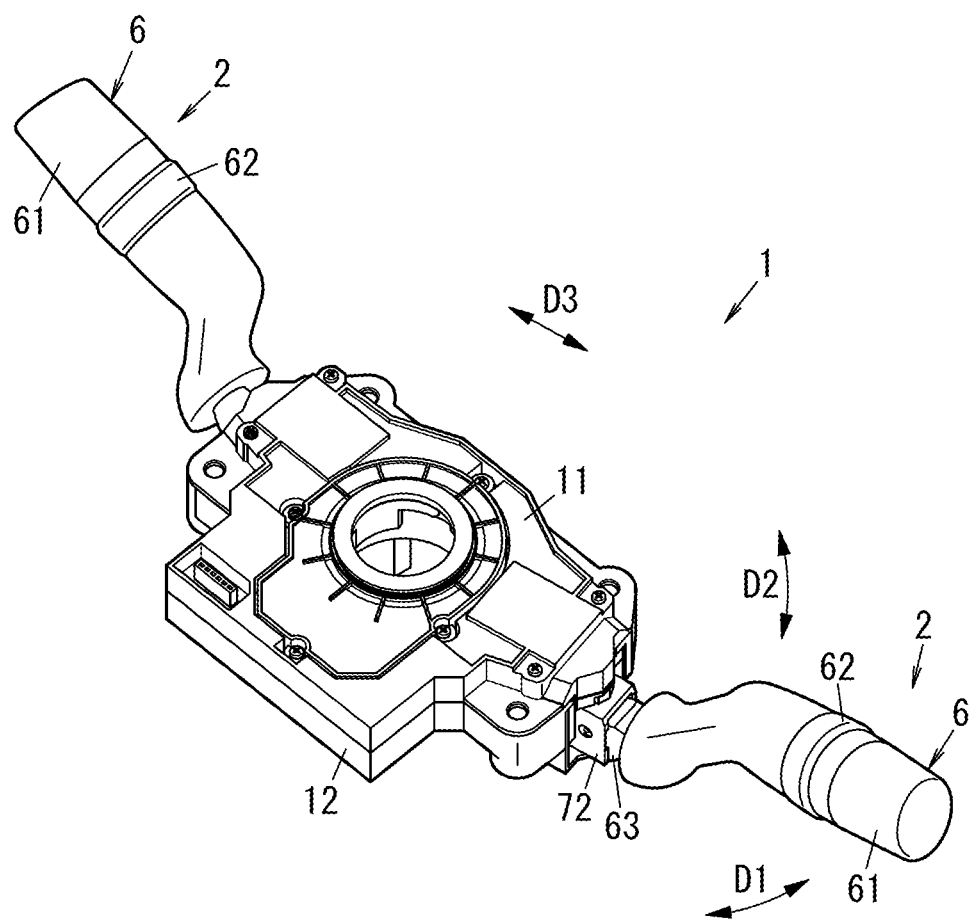
FIG. 1 is a perspective view of an input device according to an embodiment.

An input device 1 and a movable object 100 according to an embodiment will be described below with reference to the drawings. Note that the embodiment described below is a mere example of various embodiments of the present disclosure. Various modifications may be made to the following embodiment depending on design and the like as long as the object of the present disclosure is achieved. Moreover, figures described in the following embodiment are schematic views, and therefore, the ratio of sizes and the ratio of thicknesses of components in the drawings do not necessarily reflect actual dimensional ratios.

Embodiment (1) Overview

Figure 2:
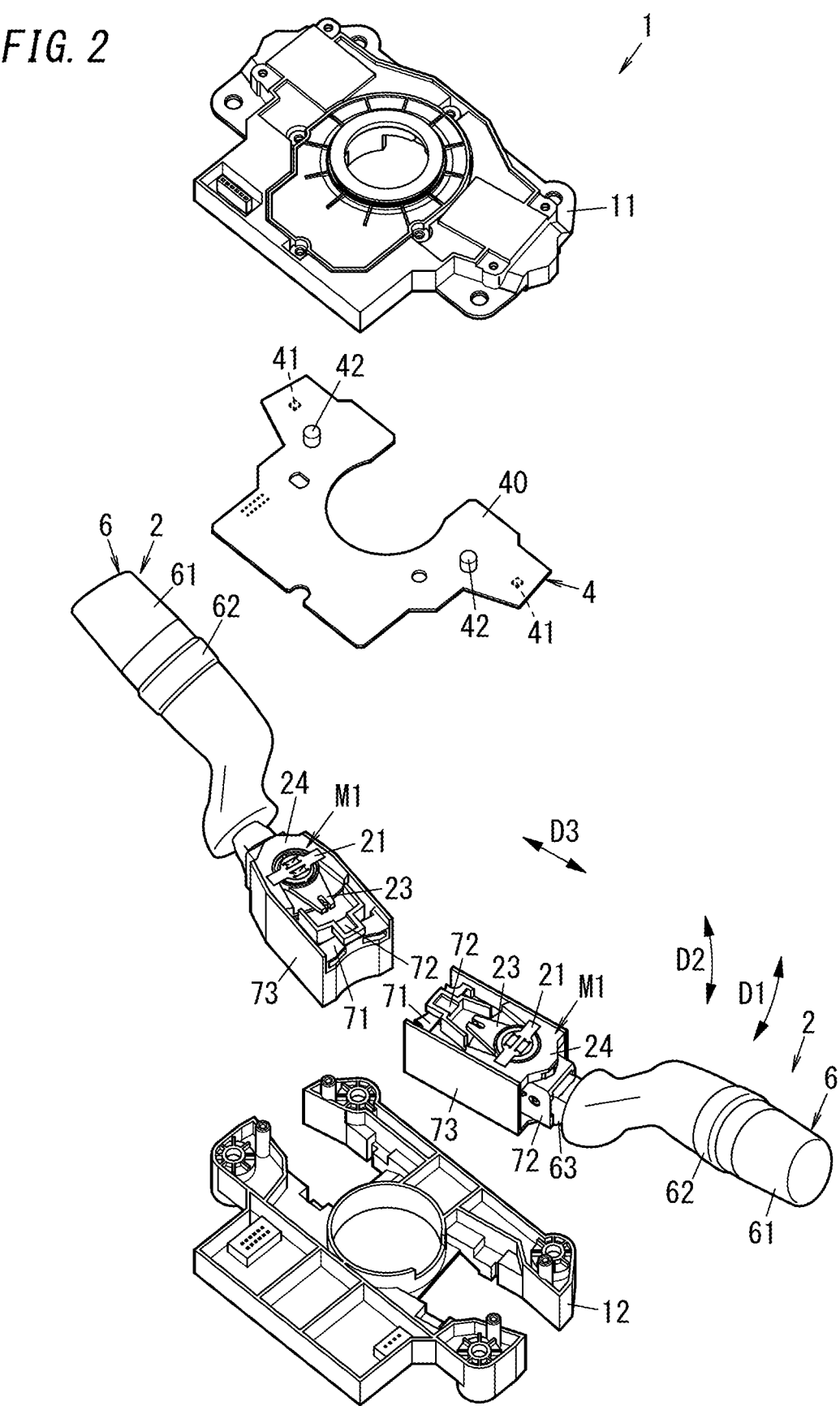
FIG. 2 is an exploded perspective view of the input device.
Figure 3:
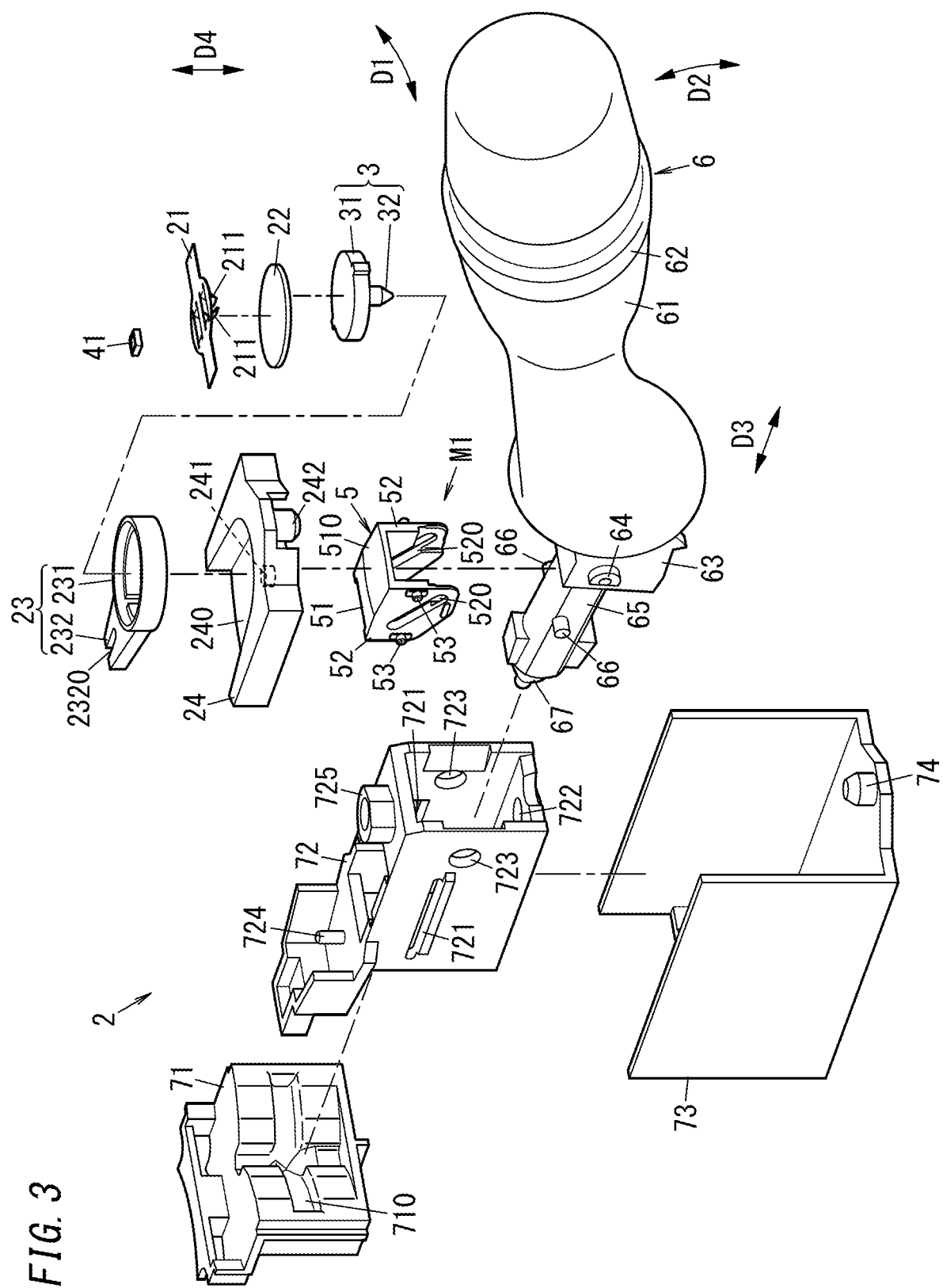
FIG. 3 is an exploded perspective view of an input block of the input device.

As shown in FIGS. 1 to 3, the input device 1 of the present embodiment includes a permanent magnet 31, a magnetic sensor 41, an operating unit 6, and a conversion mechanism M1. The magnetic sensor 41 detects a magnetic field produced by the permanent magnet 31. The conversion mechanism M1 converts a movement of the operating unit 6 into a movement of a movable member which is one of the permanent magnet 31 or the magnetic sensor 41 relative to the other of the permanent magnet 31 or the magnetic sensor 41. In other words, the conversion mechanism M1 converts the movement of the operating unit 6 into one of a movement of the magnetic sensor 41 relative to the permanent magnet 31 or a movement of the permanent magnet 31 relative to the magnetic sensor 41. The magnetic sensor 41 outputs a signal according to: a relative angle of rotation of the permanent magnet 31 around a rotation axis X1 (see FIG. 5) relative to the magnetic sensor 41; and strength of a magnetic field applied to the magnetic sensor 41. The conversion mechanism M1 converts a movement of the operating unit 6 in a first direction D1 into a first action of the movable member and converts a movement of the operating unit 6 in a second direction D2 into a second action of the movable member. The second direction D2 is a direction intersecting the first direction D1. The first action is a movement involving a change in the relative angle of rotation of the permanent magnet 31 around the rotation axis X1 relative to the magnetic sensor 41. The second action is a movement involving a change in the strength of the magnetic field applied to the magnetic sensor 41.

According to the input device 1 of the present embodiment, the conversion mechanism M1 realizes the first action of the movable member in accordance with the movement of the operating unit 6 in the first direction D1 and realizes the second action of the movable member in accordance with the movement of the operating unit 6 in the second direction D2. This enables the magnetic sensor 41 to: output a signal according to the first action when the operating unit 6 moves in the first direction D1; and output a signal according to the second action when the operating unit 6 moves in the second direction D2. That is, the magnetic sensor 41 detects the movement of the operating unit 6 in the first direction D1 and the movement of the operating unit 6 in the second direction D2. In this case, the number of magnetic sensors 41 is smaller than the case where the input device 1 includes a magnetic sensor 41 for detecting the movement of the operating unit 6 in the first direction D1 and a magnetic sensor 41 for detecting the movement of the operating unit 6 in the second direction D2.

(2) Details (2-1) Input Device

As shown in FIGS. 1 to 3, the input device 1 includes at least one input block 2 (a detection block). The input device 1 of the present embodiment includes a plurality of (in FIG. 1, two) input blocks 2. Each of the two input blocks 2 includes a permanent magnet 31, a magnetic sensor 41, an operating unit 6, and a conversion mechanism M1. Each of the two input blocks 2 receives an operation by the operating unit 6, detects the operation by the magnetic sensor 41, and outputs a signal according to a detection result by the magnetic sensor 41. The two input blocks 2 operate independently of each other.

The operating unit 6 of each input block 2 is supported via a sliding body 72 described later by a projection 74 (see FIG. 3) described later such that the operating unit 6 can be turned. The turn of the operating unit 6 relative to the projection 74 is the movement in the first direction D1.

Moreover, the operating unit 6 of each input block 2 is supported by the sliding body 72 such that the operating unit 6 can be turned. The turn of the operating unit 6 relative to the sliding body 72 is the movement in the second direction D2.

In the present embodiment, the movable member is the permanent magnet 31. That is, when an operator (a driver) moves the operating unit 6 in the first direction D1, the conversion mechanism M1 converts the movement of the operating unit 6 in the first direction D1 into the first action of the permanent magnet 31. Moreover, when the operator (the driver) moves the operating unit 6 in the second direction D2, the conversion mechanism M1 converts the movement of the operating unit 6 in the second direction D2 into the second action of the permanent magnet 31.

As described above, each of the two input blocks 2 includes one permanent magnet 31 and one magnetic sensor 41. The one magnetic sensor 41 detects the magnetic field of the one permanent magnet 31. That is, one magnetic sensor 41 of each of the two input blocks 2 corresponds to one permanent magnet 31 of the input block 2 including the one magnetic sensor 41 and detects the magnetic field of the one permanent magnet 31. One permanent magnet 31 performs the first action and the second action, and a change in the magnetic field resulting from these actions is detected by one magnetic sensor 41 corresponding to the one permanent magnet 31.

(2-2) Movable Object

Figure 4:
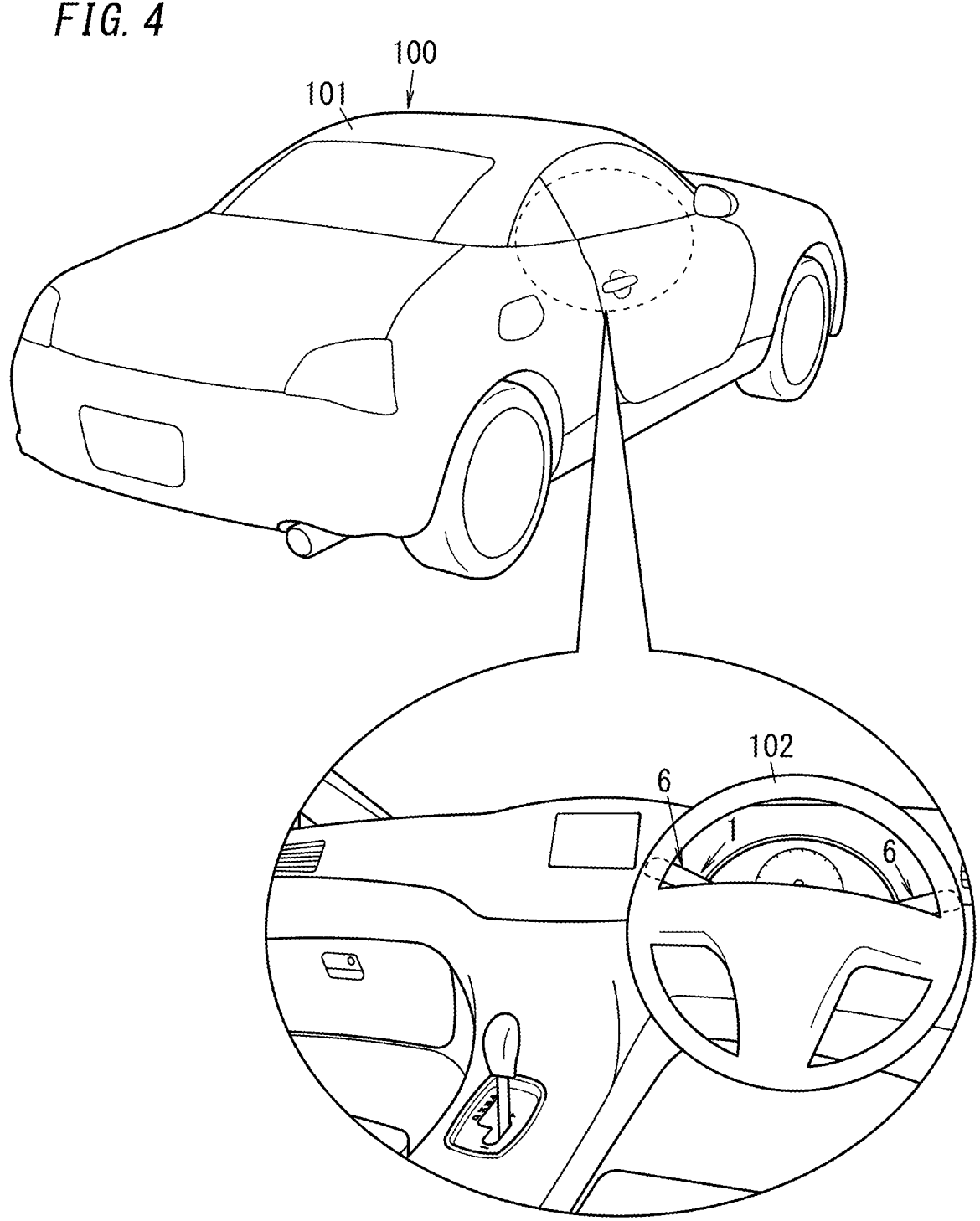
FIG. 4 is a schematic view of a movable object including the input device.

As shown in FIG. 4, the input device 1 of the present embodiment is included in the movable object 100. That is, the movable object 100 includes the input device 1. The movable object 100 further includes a movable object body 101. The input device 1 is mounted on the movable object body 101. In the present embodiment, an example in which the movable object 100 is an automobile will be described. Therefore, the movable object body 101 of the present embodiment is a vehicle body.

The movable object 100 further includes a steering wheel 102. The input device 1 is disposed in front of the steering wheel 102. That is, the input device 1 is in the back of the steering wheel 102 when seen from a driver's seat. The input device 1 includes two operating units 6. When seen from the driver's seat, the two operating units 6 protrude from the vicinity of the center of the steering wheel 102 toward the vicinity of an outer edge of the steering wheel 102. In the following description, a direction in which the two operating units 6 are aligned with each other is defined as the left/right direction (a third direction D3: see FIG. 1).

Each of the two input blocks 2 of the present embodiment constitutes a combination switch for giving switch operations to a plurality of types of control objects. For example, one of the two operating units 6 is used as a windshield wiper switch for operating windshield wipers of the automobile (the movable object 100) and a nozzle switch for operating nozzles from which windshield washer fluid is to be sprayed. The other of the two operating units 6 is used as a headlight switch for operating headlights of the automobile (the movable object 100) and a blinker switch for operating turn signals. That is, an operation given to each operating unit 6 is detected by the magnetic sensor 41 of the input device 1, and an Electronic Control Unit (ECU) of the automobile (the movable object 100) controls operation of the wipers, nozzles, headlights, turn signals, and the like in accordance with a detection result by the magnetic sensor 41.

For example, in response to the first action of the permanent magnet 31 of the input block 2 on the right side, the ECU performs switching of the headlights between a high beam state and a low beam state and flashing (short-time lighting) of the headlights in accordance with the detection result by the magnetic sensor 41. Moreover, for example, in response to the second action of the permanent magnet 31 of the input block 2 on the right side, the ECU operates the turn signals in accordance with the detection result by the magnetic sensor 41.

Further, for example, in response to the first action of the permanent magnet 31 of the input block 2 on the left side, the ECU operates the windshield wipers in accordance with the detection result by the magnetic sensor 41. Furthermore, for example, in response to the second action of the permanent magnet 31 of the input block 2 on the left side, the ECU causes the windshield washer fluid to be sprayed through the nozzles in accordance with the detection result by the magnetic sensor 41.

(2-3) Input Block

Description focusing on one of the two input blocks 2 will be given below unless otherwise noted.

As shown in FIG. 3, the input block 2 includes a magnet block 3, the magnetic sensor 41, the operating unit 6, a click member 71, the sliding body 72, a case 73, the projection 74, and the conversion mechanism M1. As used herein, "slide" means to move while slipping.

(2-3-1) Magnet Block

The magnet block 3 includes the permanent magnet 31 and a restriction part 32. The permanent magnet 31 has, for example, a disk shape. The direction of the magnetic moment (the direction from the S pole toward the N pole) of the permanent magnet 31 is along the left/right direction (the third direction D3). A thickness direction defined with respect to the permanent magnet 31 intersects the left/right direction (the third direction D3). The restriction part 32 is a non-magnetic body such as a resin molded piece. The restriction part 32 protrudes from the permanent magnet 31 in the thickness direction defined with respect to the permanent magnet 31. The restriction part 32 has: a portion which is continuous to the permanent magnet 31 and which has a columnar shape; and a tip end which faces away from the permanent magnet 31 and which has a circular cone shape. The permanent magnet 31 and the restriction part 32 are, for example, molded as one piece.

The restriction part 32 restricts the distance between the permanent magnet 31 and a tilted surface 510 of an actuator 5 described later. That is, the tip end of the restriction part 32 is in contact with the tilted surface 510, and therefore, on a straight line along the restriction part 32, the distance between the permanent magnet 31 and the tilted surface 510 is kept at the length of the restriction part 32.

(2-3-2) Magnetic Sensor

Figure 10:
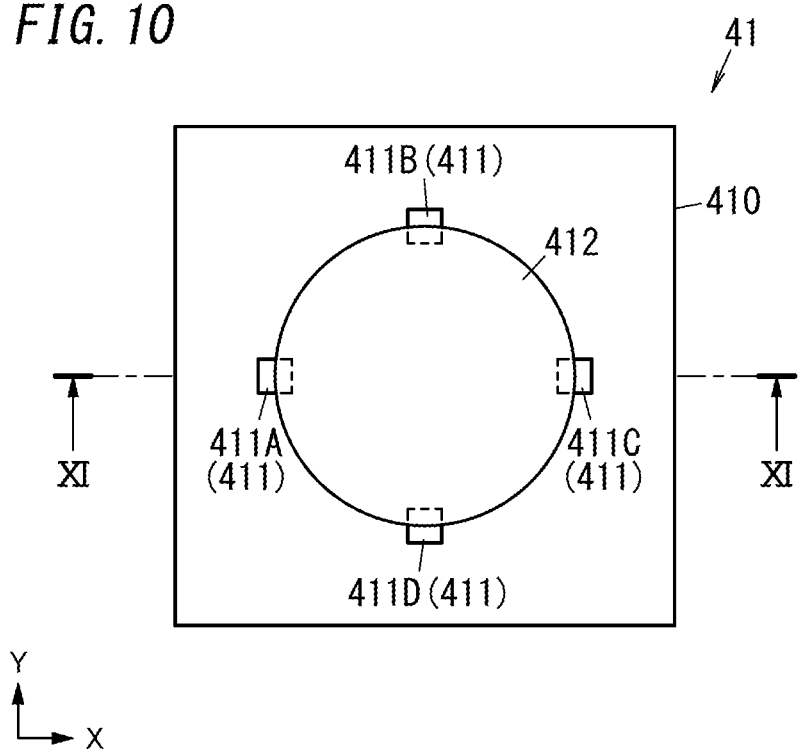
FIG. 10 is a plan view of a magnetic sensor of the input device.

The magnetic sensor 41 includes at least one Hall element 411 (see FIG. 10). The magnetic sensor 41 of the present embodiment includes four Hall elements 411. The magnetic sensor 41 is constituted by one package and the four Hall elements 411 housed in the one package. The magnetic sensor 41 detects a magnetic field produced by the permanent magnet 31.

(2-3-3) Operating Unit

The operating unit 6 includes a lever 61. The lever 61 has a substantially columnar shape. The longitudinal direction of the lever 61 is along the left/right direction (the third direction D3). In the present embodiment, an operation of moving the operating unit 6 in the first direction D1 and the second direction D2 is realized by an operation of a driver gripping the lever 61 and moving the lever 61 in the first direction D1 and the second direction D2. Moreover, the operation of the operating unit 6 in the first direction D1 and the second direction D2 is specifically the turn operation of the operating unit 6.

The operating unit 6 further includes a rotary switch 62, an intermediate portion 63, two shaft projections 64 (only one of which is shown in FIG. 3), a driving part 65, two cam projections 66, and a click pin 67.

The rotary switch 62 is attached to the lever 61. The rotary switch 62 is rotated by an operation given by a driver. The rotation operation of the rotary switch 62 is operation different from the above-described first action and second action. For example, when the rotary switch 62 of the input block 2 on the right side is rotated, the ECU switches the headlights between the lighting state and the non-lighting state. Moreover, for example, when the rotary switch 62 of the input block 2 on the left side is rotated, the ECU controls the operation of the nozzles from which the windshield washer fluid is sprayed and the operation of the windshield wipers.

The intermediate portion 63 protrudes from one end in the longitudinal direction of the lever 61. The intermediate portion 63 is present between the lever 61 and the driving part 65 and connects the lever 61 and the driving part 65 to each other.

The driving part 65 protrudes from the intermediate portion 63. The driving part 65 has a cylindrical shape. The longitudinal direction of the driving part 65 is along the left/right direction (the third direction D3). The driving part 65 has an accommodation space in its interior.

Each of the two shaft projections 64 protrudes from the intermediate portion 63 in a direction orthogonal to the longitudinal direction of the driving part 65. One of the shaft projections 64 protrudes from the intermediate portion 63 in a direction opposite to the other of the shaft projections 64. Each of the two shaft projections 64 has a bottomed cylindrical shape.

Each of the two cam projections 66 protrudes from the driving part 65 in a direction orthogonal to the longitudinal direction of the driving part 65. One of the cam projections 66 protrudes from the driving part 65 in a direction opposite to the other of the cam projections 66. Each of the two cam projections 66 has a columnar shape.

The click pin 67 has a columnar shape. The click pin 67 is partially hosed in the driving part 65. The click pin 67 has a tip end protruding from one end of the driving part 65. The one end of the driving part 65 is on an opposite side of the lever 61.

The operating unit 6 further includes a click spring housed in the driving part 65. The click spring is, for example, a helical compression spring. The click spring applies, to the click pin 67, elastic force in a direction in which the click pin 67 is moved toward an outer side of the driving part 65 (toward the click member 71).

(2-3-4) Peripheral Configuration of Operating Unit

The click member 71 is disposed at a location at which the click member 71 is in contact with the click pin 67. When viewed in the longitudinal direction of the driving part 65, the outer shape of the click member 71 is rectangular. The click member 71 has a surface which comes into contact with the click pin 67 and which has a guide groove 710. The guide groove 710 has a cross shape. The operating unit 6 moves in the first direction D1 and the second direction D2 so that the click pin 67 moves within the guide groove 710. That is, the click pin 67 moves in the first direction D1 from a basic position at the center of the cross of the guide groove 710, thereby restricting the movement of the operating unit 6 of the present embodiment in the second direction D2, and the click pin 67 moves in the second direction D2 from the basic position, thereby restricting the movement of the operating unit 6 of the present embodiment in the first direction D1. Note that the shape of the guide groove 710 is not limited to the cross shape, but the shape of the guide groove 710 may be modified accordingly depending on a movement required for the operating unit 6.

Moreover, the guide groove 710 has a bottom surface provided with a projection. The operating unit 6 provides a user with a click feeling when the click pin 67 climbs over the projection. Moreover, the spring provided to the operating unit 6 applies spring force so that the click pin 67 moves toward the basic position. When the click pin 67 climbs over the projection, the operation of moving the click pin 67 to the basic position is inhibited. That is, the movement of the operating unit 6 is locked.

The sliding body 72 has a rectangular tubular shape. The axial direction of the sliding body 72 is along the longitudinal direction of the driving part 65. In the interior of the sliding body 72, the driving part 65 and the actuator 5 described later are inserted. The sliding body 72 includes two guide holes 721, a first shaft hole 722, and two second shaft holes 723. The two guide holes 721 are oblong holes along the longitudinal direction (left/right direction) of the driving part 65. In the two guide holes 721, four guide projections 53 described later of the actuator 5 are inserted. In the first shaft hole 722, the projection 74 protruding from the case 73 is inserted. The sliding body 72 is configured to turn in the first direction D1 relative to the case 73. More specifically, the sliding body 72, together with the operating unit 6, is configured to turn in the first direction D1 around the projection 74 as a shaft relative to the case 73. In the two second shaft holes 723, the two shaft projections 64 of the operating unit 6 are inserted. The operating unit 6 is configured to turn in the second direction D2 relative to the sliding body 72. More specifically, the operating unit 6 is configured to turn in the second direction D2 around the two shaft projections 64, which serves as rotary shafts, relative to the sliding body 72.

The sliding body 72 further includes a shaft part 724 and a tubular part 725. The shaft part 724 has a columnar shape. The shaft part 724 is inserted in a recess 2320 formed in a holder 23 described later. The tubular part 725 has a cylindrical shape. In the tubular part 725, a projection 242 of a holder cover 24 described later is inserted.

The case 73 has a hollow rectangular parallelepiped shape having two open surfaces adjacent to each other. In the case 73, the click member 71, the sliding body 72, and part of the operating unit 6 inserted in the sliding body 72 are housed. Through one of the open surfaces of the case 73, the operating unit 6 is disposed to extend inside and outside the case 73. The input block 2 may have a cover covering the other of the open surfaces of the case 73.

The projection 74 protrudes from an inner surface of the case 73. The projection 74 is inserted in the first shaft hole 722 of the sliding body 72. The sliding body 72, is configured to, together with the operating unit 6, turn in the first direction D1 around the projection 74 as a rotary shaft relative to the case 73 while slipping on the inner surface of the case 73.

The turn of the sliding body 72 and the operating unit 6 in the first direction D1 is restricted by the case 73. That is, when the sliding body 72 is turned from a reference position in the first direction D1 by a first angle, the sliding body 72 comes into contact with the inner surface of the case 73, and therefore, the sliding body 72 and the operating unit 6 are not turned in the first direction D1 beyond the first angle.

The turn of the operating unit 6 in the second direction D2 is restricted by the sliding body 72. That is, when the operating unit 6 is turned from the reference position in the second direction D2 by a second angle, the operating unit 6 comes into contact with an inner surface of the sliding body 72, and therefore, the operating unit 6 is not turned in the second direction D2 beyond the second angle.

(2-3-5) Conversion Mechanism

The conversion mechanism M1 includes the actuator 5, an elastic part 21, a magnet cover 22, the holder 23, and the holder cover 24. Moreover, the conversion mechanism M1 further includes the restriction part 32. The restriction part 32 is a component of the conversion mechanism M1 and is at the same time a component of the magnet block 3.

The holder 23 includes a magnet holding part 231 and an extension part 232. The magnet holding part 231 has an annular shape. On an inner side of the magnet holding part 231, the permanent magnet 31 is held. The extension part 232 has a trapezoidal plate shape in plan view. The extension part 232 is continuous to the magnet holding part 231. The extension part 232 extends from the magnet holding part 231 in a radial direction of the magnet holding part 231. The extension part 232 has the recess 2320. In the recess 2320, the shaft part 724 of the sliding body 72 is inserted.

The actuator 5 is a converter member for converting the movement of the operating unit 6 into the movement of the magnet block 3. When viewed in the longitudinal direction of the driving part 65, the actuator 5 has a U-shape. The actuator 5 includes a connecting board 51 and two side boards 52. The connecting board 51 has a rectangular shape in plan view. The two side boards 52 protrude from two respective sides of the connecting board 51 which face each other along a thickness direction defined with respect to the connecting board 51.

The actuator 5 further includes the four guide projections 53 (only two of which are shown in FIG. 3). From one side board 52 of the two side boards 52, two guide projections 53 of the four guide projections 53 protrude, and from the other side board 52, remaining two guide projections 53 protrude. In one guide hole 721 of the two guide holes 721 formed in the sliding body 72, two guide projections 53 of the four guide projections 53 are inserted, and in the other guide hole 721, the remaining two guide projections 53 are inserted. Thus, the direction of the movement of the actuator 5 relative to the sliding body 72 is limited to the left/right direction (the third direction D3) (directions indicated by arrows A5 and A6 in FIG. 7). That is, while the actuator 5 moves in the left/right direction (the third direction D3) relative to the sliding body 72, the movement of the actuator 5 in the second direction D2 is restricted.

Moreover, each of the two side boards 52 of the actuator 5 has a cam hole 520. That is, the actuator 5 has two cam holes 520. The two cam holes 520 each have a length in a direction oblique to the left/right direction (the third direction D3). The two cam holes 520 correspond to the two cam projections 66 of the operating unit 6 on a one-to-one basis. In each cam hole 520, a corresponding one of the cam projections 66 is inserted. When the operating unit 6 moves in the second direction D2 relative to the sliding body 72, the actuator 5 moves in the left/right direction (the third direction D3) relative to the operating unit 6 (see FIGS. 7 to 9) while changing the position of the cam projection 66 in the interior of each cam hole 520.

The actuator 5 has the tilted surface 510 tilted relative to a flat surface orthogonal to a direction (a fourth direction D4) in which the permanent magnet 31 moves as a result of the second action. The restriction part 32 of the magnet block 3 is in contact with the tilted surface 510. The fourth direction D4 is a direction intersecting the third direction D3. More specifically, the fourth direction D4 is the up/down direction orthogonal to the third direction D3. As used herein, the "up/down direction" is defined as a direction in which the actuator 5 and the permanent magnet 31 are aligned with each other. However, this definition should not be construed as limiting the direction of the input device 1 in use. Note that "orthogonal" in the present disclosure is not limited to referring to an intersection strictly at an angle of 90 degrees. For example, "orthogonal" may also refer to an intersection at an angle greater than or equal to 85 degrees and less than or equal to 95 degrees.

The actuator 5 moves, in accordance with the movement of the operating unit 6 in the second direction D2, such that the position of the restriction part 32 on the tilted surface 510 changes to realize the second action of the permanent magnet 31. That is, when the operating unit 6 is turned in the second direction D2, the actuator 5 moves in the third direction D3, which changes the position of the restriction part 32 on the tilted surface 510 of the actuator 5 (see FIGS. 7 to 9). In other words, the actuator 5 moves in the third direction D3, thereby changing a contact point at which the tilted surface 510 of the actuator 5 is in contact with the restriction part 32. This moves the magnet block 3 in the fourth direction D4. That is, the movement of the operating unit 6 in the second direction D2 is converted into the second action of the permanent magnet 31. The second action changes the distance between the magnetic sensor 41 and the permanent magnet 31. The second action of the permanent magnet 31 is a linear movement (linear motion). Moreover, the permanent magnet 31 moves, in its second action, relative to the holder 23 holding the permanent magnet 31. Specifically, the permanent magnet 31 moves, in its second action, in the interior of the holder 23. The holder 23 restricts the movement of the permanent magnet 31 in directions other than the fourth direction D4.

Thus, the conversion mechanism M1 moves, in accordance with the movement of the operating unit 6 in the second direction D2, the permanent magnet 31 relative to the holder 23, thereby realizing the second action of the permanent magnet 31.

The holder cover 24 is housed in the case 73. The holder cover 24 has a rectangular plate shape in plan view. The holder cover 24 has a recess 240. In the recess 240, the holder 23 is disposed. The holder cover 24 has a through hole 241 formed in a bottom surface of the recess 240. The restriction part 32 of the magnet block 3 extends through the through hole 241. Moreover, the holder cover 24 has the projection 242 inserted in the tubular part 725 of the sliding body 72. The holder cover 24 supports the sliding body 72 such that the sliding body 72 can be turned. More specifically, the holder cover 24 supports the sliding body 72 such that the sliding body 72 can be turned around the projection 242, which serves as a rotary shaft.

Figure 5:
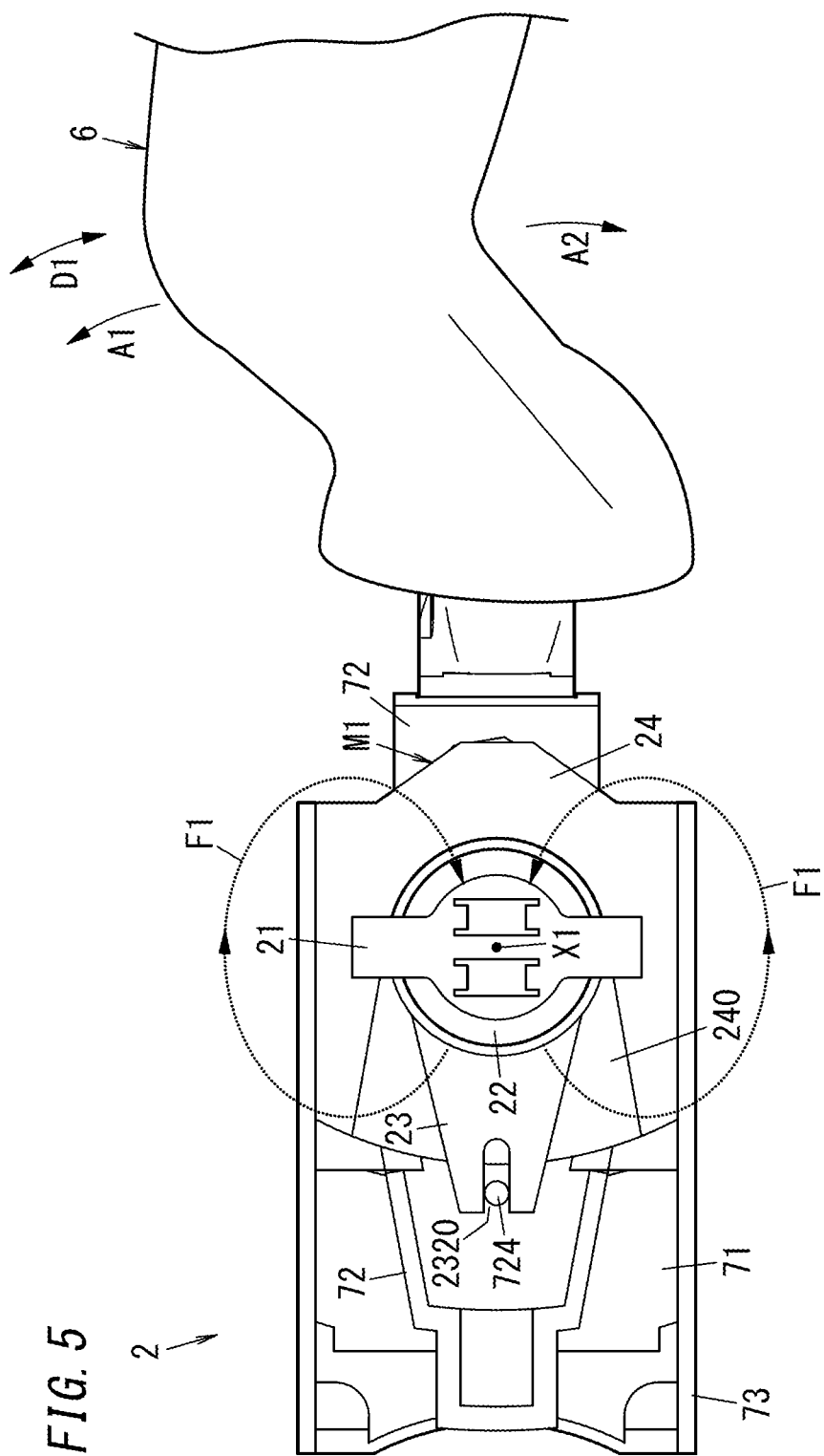
FIG. 5 is a front view of the input block of the input device before being operated.
Figure 6:
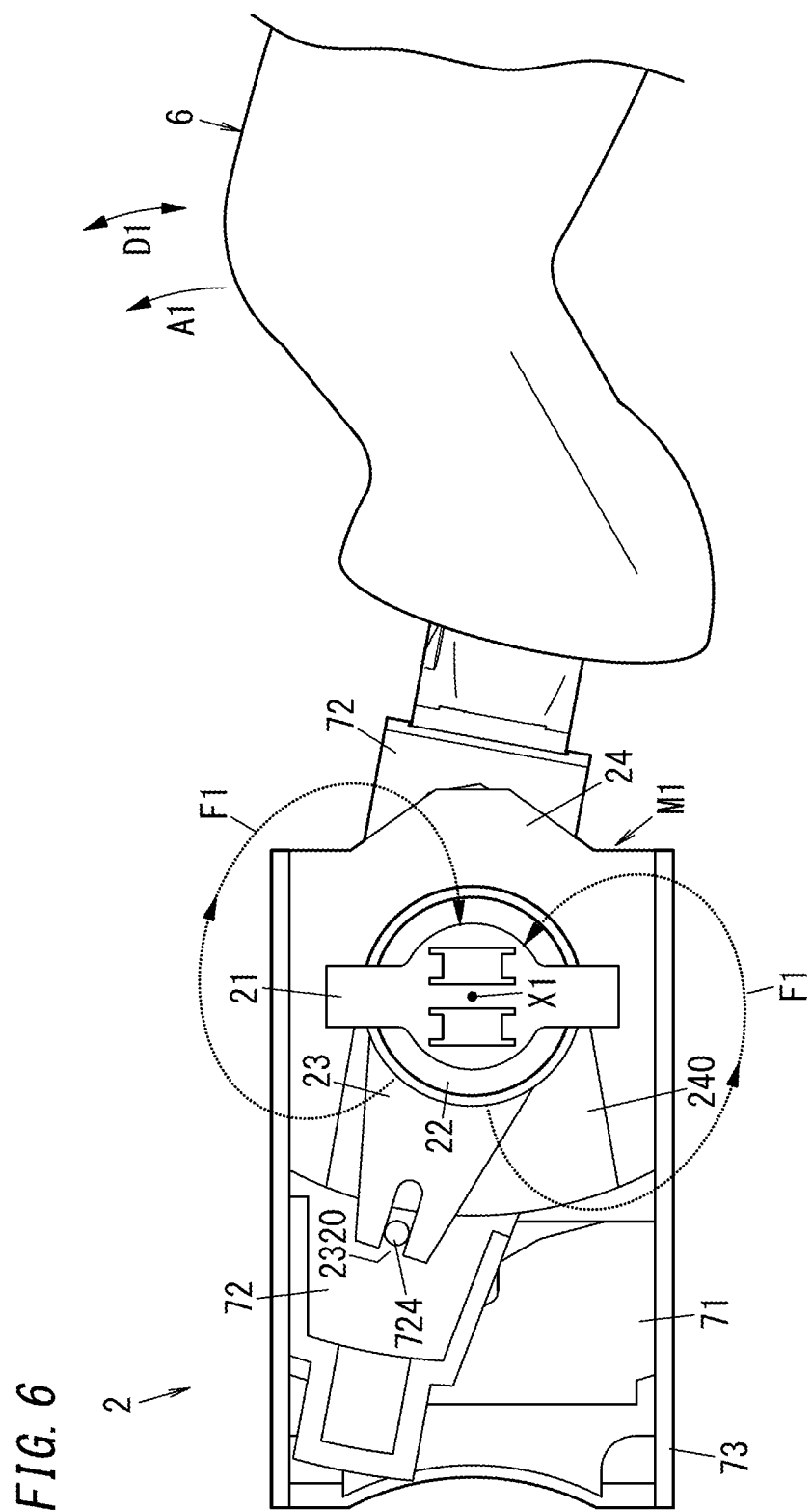
FIG. 6 is a front view of the input block of the input device after being operated.

When the operating unit 6 is turned in the first direction D1, the sliding body 72 is turned in the first direction D1 relative to the case 73 and the holder cover 24 (see FIGS. 5 and 6). When the sliding body 72 is turned in the first direction D1, the holder 23 is pulled by the shaft part 724 of the sliding body 72 inserted in the recess 2320 and thus rotates in the first direction D1 relative to the holder cover 24. That is, the holder 23 rotates in the interior of the recess 240 of the holder cover 24. Along with the rotation of the holder 23 in the first direction D1, the permanent magnet 31 held by the holder 23 rotates in the first direction D1. In sum, when the operating unit 6 is turned in the first direction D1 relative to the case 73 and the holder cover 24, the sliding body 72, the holder 23, and the permanent magnet 31 together rotate relative to the case 73 and the holder cover 24. That is, the movement of the operating unit 6 in the first direction D1 is converted into the first action of the permanent magnet 31. The first action changes the relative angle of rotation of the permanent magnet 31 relative to the magnetic sensor 41. The angle of rotation is an angle of rotation around the rotation axis X1 (see FIG. 5). The rotation axis X1 is a virtual axis representing the center of the rotation of the movable member (in this embodiment, the permanent magnet 31). The rotation axis X1 extends through the permanent magnet 31. The direction of the rotation axis X1 is along the fourth direction D4 (in a depth direction with respect to the plane of FIG. 5).

As described above, the holder 23 holds the permanent magnet 31, and in accordance with the movement of the operating unit 6 in the first direction D1, the holder 23 rotates together with the permanent magnet 31, thereby realizing the first action of the permanent magnet 31.

The magnet cover 22 has a disk shape. The magnet cover 22 is, for example, a non-magnetic body. The magnet cover 22 overlaps the permanent magnet 31. The permanent magnet 31 is sandwiched between the magnet cover 22 and the holder cover 24 (see FIG. 7).

The elastic part 21 is fixed to the holder cover 24. The elastic part 21 has a plate shape. The permanent magnet 31 and the magnet cover 22 are sandwiched between the elastic part 21 and the holder cover 24 (see FIG. 7).

The elastic part 21 applies force to the permanent magnet 31 along the direction (the fourth direction D4) of the movement of the permanent magnet 31 as a result of the second action. More specifically, the elastic part 21 has a plurality of pawls 211. The plurality of pawls 211 are elastic. The plurality of pawls 211 push the magnet cover 22 toward the permanent magnet 31. Thus, the elastic part 21 applies force to the permanent magnet 31 via the magnet cover 22 along the fourth direction D4.

(2-4) Substrate Block

As shown in FIG. 2, the input device 1 includes a substrate block 4, a first body 11, and a second body 12. The first body 11 and the second body 12 constitute a housing section in which the substrate block 4 is housed.

The substrate block 4 includes a substrate 40, a plurality of (in FIG. 2, two) magnetic sensors 41, and a plurality of electronic components 42. The two magnetic sensors 41 and the plurality of electronic components 42 are mounted on the substrate 40. Each magnetic sensor 41 is a component of the substrate block 4 and is at the same time a component of the input block 2.

Each of the two input blocks 2 includes one permanent magnet 31 and one magnetic sensor 41 configured to detect the first action and the second action of the one permanent magnet 31. That is, the input device 1 includes two magnetic sensors 41 and two permanent magnets 31 corresponding to each other on a one-to-one basis. In other words, one permanent magnet 31 corresponds to one magnetic sensor 41. Each magnetic sensor 41 detects a magnetic field produced by a corresponding one of the permanent magnets 31. Each magnetic sensor 41 is disposed with a prescribed distance in the fourth direction D4 from the corresponding one of the permanent magnets 31. Each magnetic sensor 41 is mounted on the substrate 40 to face the corresponding one of the permanent magnets 31. Here, saying that the magnetic sensor 41 faces the permanent magnet 31 includes a case where another member (e.g., the magnet cover 22) is provided between the magnetic sensor 41 and the permanent magnet 31 as in the case of the present embodiment. At least, the magnetic sensor 41 is disposed at a location where the magnetic sensor 41 can detect the magnetic field produced by the permanent magnet 31.

(2-5) First Body and Second Body

Each of the first body 11 and the second body 12 has a box shape with one surface being an opening surface. The first body 11 and the second body 12 are coupled to each other with the one surface (the opening surface) of the first body 11 and the one surface (opening surface) of the second body 12 facing each other. The first body 11 and the second body 12 are coupled to each other by, for example, being screwed.

As described above, the magnetic sensor 41 is mounted on the substrate 40. Moreover, the first body 11 is disposed on the same side of the magnetic sensor 41 with respect to the location of the permanent magnet 31. The second body 12 is coupled to the first body 11. The second body 12 is disposed on an opposite side of the magnetic sensor 41 with respect to the location of the permanent magnet 31. The substrate 40 is held by the first body 11. More specifically, the substrate 40 is housed in the first body 11. Moreover, the second body 12 holds the two input blocks 2.

(2-6) Details of Magnetic Sensor

Figure 11:
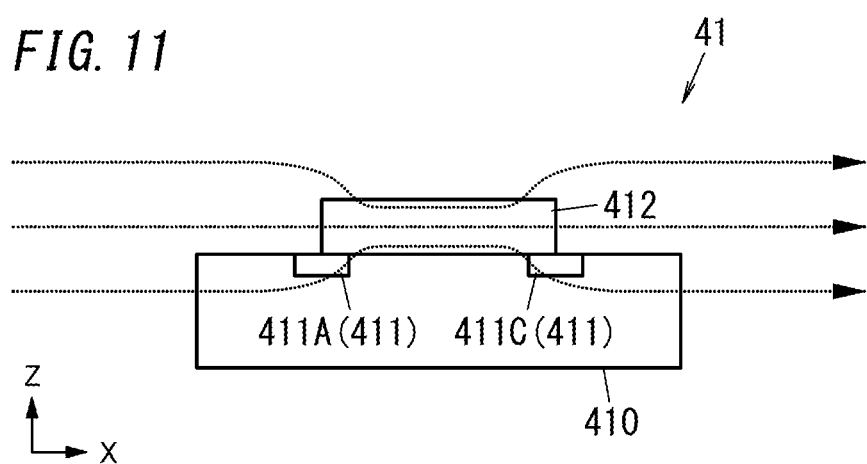
FIG. 11 is a side sectional view of the magnetic sensor of the input device.

FIG. 10 is a plan view of the magnetic sensor 41, and FIG. 11 is a cross sectional view taken along line XI-XI of FIG. 10. In FIG. 11, hatching representing a cross section is omitted.

The magnetic sensor 41 includes a substrate 410, four Hall elements 411, and a magnetic plate 412. The substrate 410 is, for example, a silicon substrate. The substrate 410 has a square shape in plan view. The magnetic plate 412 has a disk shape. The magnetic plate 412 is put on the center of the substrate 410. When viewed in the thickness direction defined with respect to the substrate 410, the diameter of the magnetic plate 412 is shorter than the length of one side of the substrate 410. When viewed in the thickness direction defined with respect to the substrate 410, the four Hall elements 411 are arranged at locations where the four Hall elements 411 overlap the outer edge of the magnetic plate 412. The four Hall elements 411 are arranged at equal intervals. In the following description, the four Hall elements 411 may be referred to as Hall elements 411A, 411B, 411C, and 411D to distinguish the four Hall elements 411 from one another. Along the circumferential direction of the magnetic plate 412, the Hall elements 411A, 411B, 411C, and 411D are sequentially aligned in this order.

Here, along the thickness direction defined with respect to the substrate 410, a Z-axis is defined, and along two directions orthogonal to the Z-axis direction, an X-axis and a Y-axis which are orthogonal to each other are defined. Each of the four Hall elements 411 detects a magnetic field in the Z-axis direction. The Hall elements 411A and 411C are aligned with each other in the X-axis direction. The Hall elements 411B and 411D are aligned with each other in the Y-axial direction.

In FIG. 11, the magnetic field in the X-axis direction is indicated by arrows (magnetic field lines). As shown in FIG. 11, the magnetic field in the X-axis direction is bent by the magnetic plate 412. As a result, the magnetic field applied to the magnetic sensor 41 in the X-axis direction includes a component in the Z-axis direction at locations of the Hall elements 411A and 411C. That is, the Hall elements 411A and 411C output voltages in accordance with the strength of the magnetic field applied to the magnetic sensor 41 in the X-axis direction and the strength of the magnetic field applied to the magnetic sensor 41 in the Z-axis direction. More specifically, an output voltage $V_A$ of the Hall element 411A and an output voltage $V_C$ of the Hall element 411C are respectively represented by (Formula 1) and (Formula 2).

$$V_A = V_{BX} - V_{BZ} \quad \text{(Formula 1)}$$

$$V_C = V_{BX} - V_{BZ} \quad \text{(Formula 2)}$$

where $V_{BX}$ is a value proportional to the strength of the magnetic field applied to the magnetic sensor 41 in the X-axis direction, and $V_{BZ}$ is a value proportional to the strength of the magnetic field applied to the magnetic sensor 41 in the Z-axis direction.

From (Formula 1) and (Formula 2), (Formula 3) and (Formula 4) hold true.

$$V_A - V_C = 2V_{BX} \quad \text{(Formula 3)}$$

$$V_A + V_C = -2V_{BZ} \quad \text{(Formula 4)}$$

Thus, from the output voltage $V_A$ of the Hall element 411A and the output voltage $V_C$ of the Hall element 411C, the strength of the magnetic field applied to the magnetic sensor 41 in the X-axis direction and the strength of the magnetic field applied to the magnetic sensor 41 in the Z-axis direction can be obtained.

Similarly, from the sum of, and the difference between, output voltages of the Hall elements 411B and 411D aligned with each other in the Y-axis direction, the strength of the magnetic field applied to the magnetic sensor 41 in the Y-axis direction and the strength of the magnetic field applied to the magnetic sensor 41 in the Z-axis direction can be obtained. After all, based on the output from the magnetic sensor 41, the strength and the orientation of the magnetic field applied to the magnetic sensor 41 can be obtained. The process of obtaining, from the output voltage of the four Hall elements 411, the strength and the orientation of the magnetic field applied to the magnetic sensor 41 is executed by, for example, the ECU. In this regard, however, the magnetic sensor 41 may include a processing circuit, and the processing circuit of the magnetic sensor 41 may execute at least part of the process.

The first action of the permanent magnet 31 changes the relative angle of rotation of the permanent magnet 31 relative to the magnetic sensor 41, which changes the orientation of the magnetic field applied to the magnetic sensor 41. Moreover, the second action of the permanent magnet 31 changes the distance between the magnetic sensor 41 and the permanent magnet 31, which changes the strength of the magnetic field applied to the magnetic sensor 41. That is, the magnetic sensor 41 outputs a signal according to the relative angle of rotation of the permanent magnet 31 relative to the magnetic sensor 41 and the distance between the magnetic sensor 41 and the permanent magnet 31.

(3) Operation Example (3-1) First Action

The operating unit 6 is configured to turn in the first direction D1. FIG. 5 shows the input block 2 when the operating unit 6 is located at the center of a range within which the operating unit 6 can be turned. Starting from this state, a driver turns the operating unit 6 toward one side (in an orientation indicated by an arrow A1) or the other side (in an orientation indicated by an arrow A2) in the first direction D1. FIG. 6 shows the input block 2 after the operating unit 6 is turned from the location in FIG. 5 in the orientation indicated by the arrow A2. The conversion mechanism M1 converts the movement of the operating unit 6 in the first direction D1 (the turn in the orientation indicated by the arrow A2) into the first action of the permanent magnet 31 (see FIG. 3). That is, along with the turn of the operating unit 6 in the first direction D1, the permanent magnet 31 rotates in the first direction D1 around the rotation axis X1. Thus, the first action is a movement involving a change in the relative angle of rotation of the permanent magnet 31 relative to the magnetic sensor 41 (see FIG. 7). Moreover, in the first action, the distance between the magnetic sensor 41 and the permanent magnet 31 is maintained. Therefore, in the first action, the strength of the magnetic field applied to the magnetic sensor 41 is maintained. Here, "the distance between the magnetic sensor 41 and the permanent magnet 31 is maintained" is not limited to referring to the case where the distance between the magnetic sensor 41 and the permanent magnet 31 does not change at all but refers to also the case where the distance changes within an allowable error range.

In FIGS. 5 and 6, a magnetic field line F1 of a magnetic field produced by the permanent magnet 31 is partially shown. As shown in the figures, the rotation of the permanent magnet 31 changes the orientation of the magnetic field line F1. Thus, the orientation of the magnetic field detected by the magnetic sensor 41 changes. That is, the magnetic sensor 41 detects the first action as the change in the orientation of the magnetic field. The ECU controls, in accordance with the orientation of the magnetic field detected by the magnetic sensor 41, operation of the wipers, nozzles, headlights, turn signals, and the like of a vehicle.

Moreover, from the state shown in FIG. 6, the operating unit 6 is turned in the orientation indicated by the arrow A1, and thereby, the operating unit 6 is returned to the state shown in FIG. 5.

Moreover, from the state shown in FIG. 5, the operating unit 6 is turned in the orientation indicated by the arrow A1, and thereby, the relative angle of rotation of the permanent magnet 31 relative to the magnetic sensor 41 becomes an angle of rotation different from those in the state shown in FIG. 5 and the state shown in FIG. 6. Therefore, the orientation of the magnetic field detected by the magnetic sensor 41 is different from those in the state shown in FIG. 5 and the state shown in FIG. 6. Thus, when the operating unit 6 moves in the first direction D1, the magnetic sensor 41 can make different outputs corresponding to the two or more positions (angles of rotation) of the operating unit 6. Thus, the movable object 100 is configured to perform switching between two or more variations of control in accordance with the positions of the operating unit 6. Moreover, from the state shown in FIG. 5, the operating unit 6 is turned in the orientation indicated by the arrow A1, and thereafter, the operating unit 6 is turned in the orientation indicated by the arrow A2, and thereby, the operating unit 6 is returned to the state shown in FIG. 5.

For example, the movable object 100 is configured to, when the operating unit 6 moves in the first direction D1, perform switching among five variations of control in accordance with the position of the operating unit 6. That is, the movable object 100 is configured to perform switching among the five variations of control in accordance with which of first to fifth ranges the relative angle of rotation of the permanent magnet 31 relative to the magnetic sensor 41 (the orientation of a magnetic field detected by the magnetic sensor 41) is within.

In a more specific example, the ECU of the movable object 100 does not operate the turn signals when the relative angle of rotation of the permanent magnet 31 relative to the magnetic sensor 41 is within the third range (the state shown in FIG. 5). The ECU flashes the turn signal on the right side when the angle of rotation is within the first range (the state shown in FIG. 6) and when the angle of rotation is within the second range (a state where the operating unit 6 is located between the states shown in FIGS. 5 and 6). When a driver stops operating the operating unit 6 with the angle of rotation being within the second range, the spring force of the spring provided to the operating unit 6 returns the operating unit 6 to the initial position, and therefore, the turn signal is turned off. When the angle of rotation is within the first range, the operating unit 6 is locked. Thereafter, the driver manually returns the operating unit 6 to the initial position or turns the steering wheel 102 by a prescribed angle or greater to release the lock so as to return the operating unit 6 to the initial position, and thereby, the turn signal is turned off. The first and second ranges respectively correspond to a sign of a right lane change and a sign of a right turn. The fourth and fifth ranges respectively correspond to a sign of a left lane change and a sign of a left turn. The fourth and fifth ranges are ranges on an opposite side of the third range from the first and second ranges.

(3-2) Second Action

Figure 7:
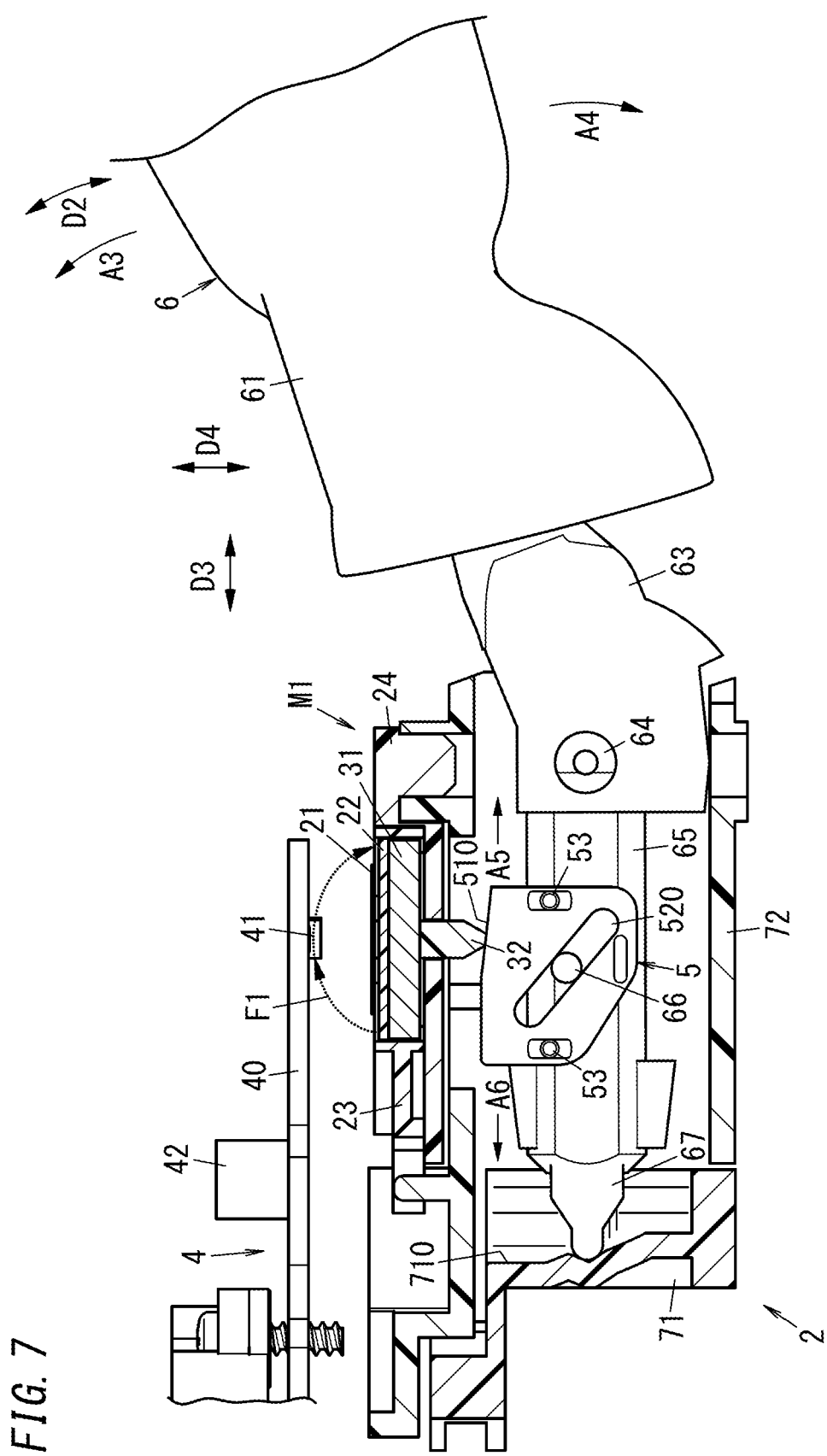
FIG. 7 is a bottom view of the input block of the input device before being operated.
Figure 8:
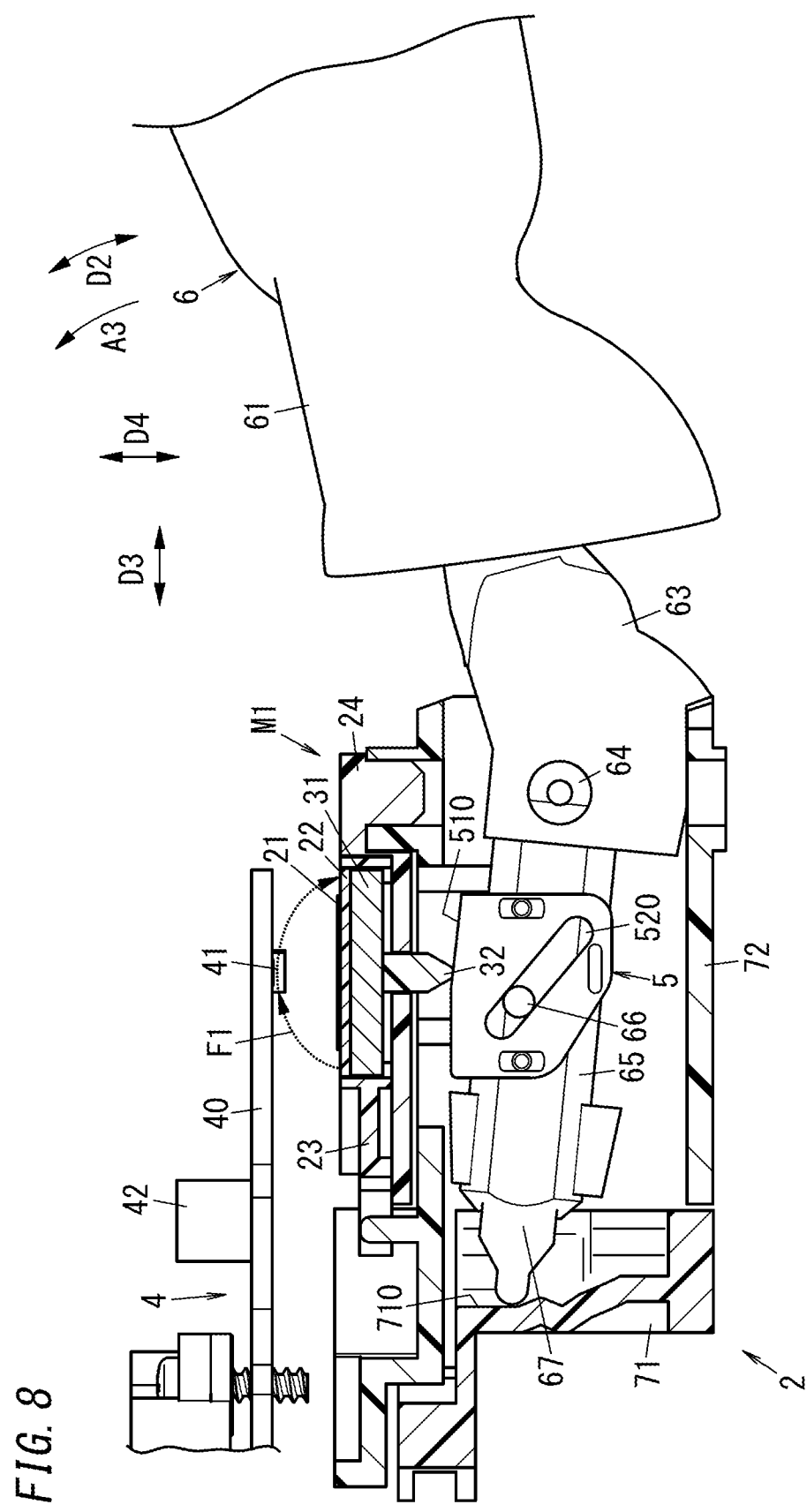
FIG. 8 is a bottom view of the input block of the input device after being operated.
Figure 9:
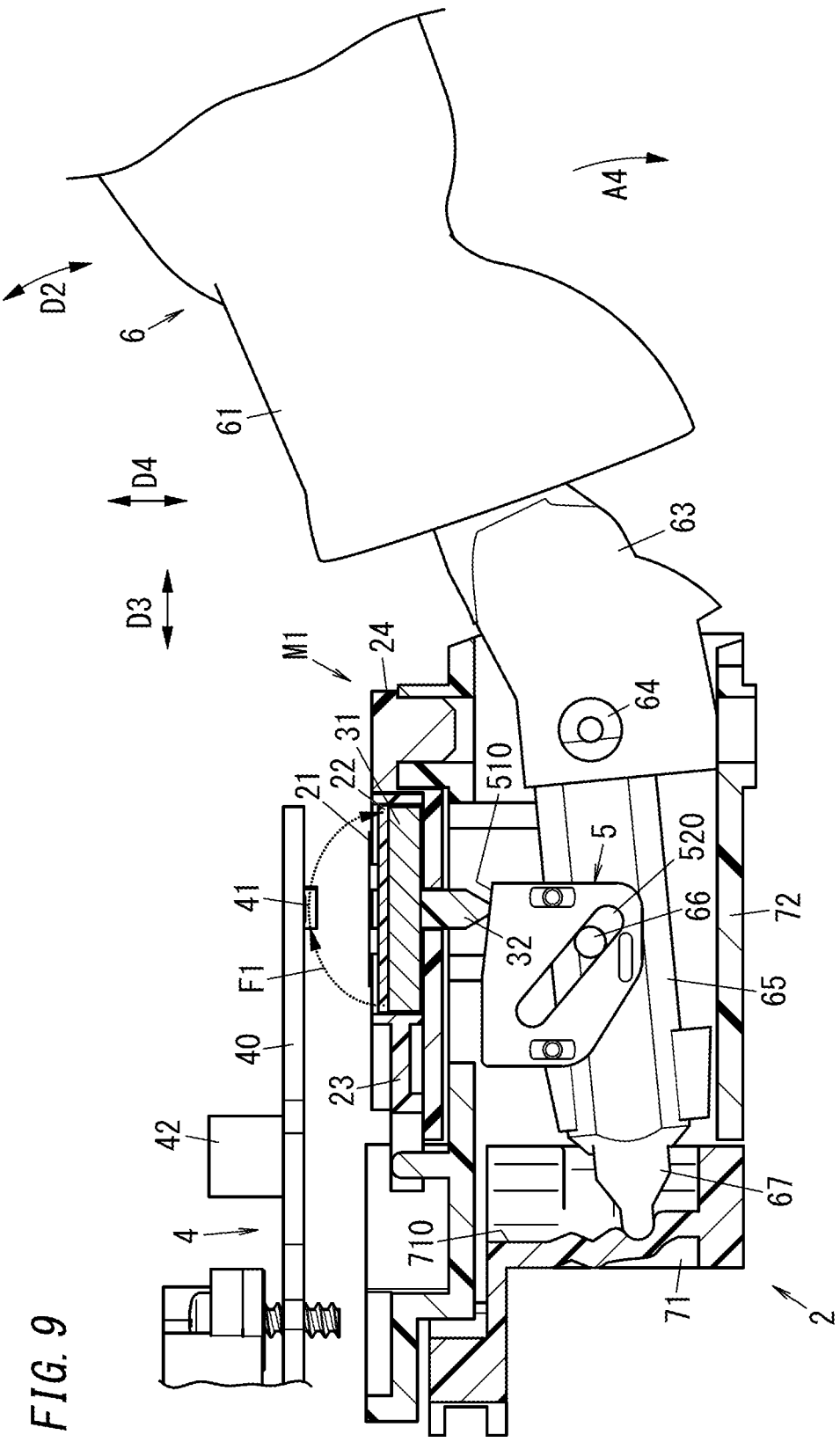
FIG. 9 is a bottom view of the input block of the input device after being operated.

In FIGS. 7 to 9, a magnetic field line F1 of a magnetic field produced by the permanent magnet 31 is partially shown. The operating unit 6 is configured to turn in the second direction D2. FIG. 7 shows the input block 2 when the operating unit 6 is located at the center of a range within which the operating unit 6 can be turned. Starting from this state, a driver turns the operating unit 6 toward one side (in an orientation indicated by an arrow A3) or the other side (in an orientation indicated by an arrow A4) in the second direction D2. FIG. 8 shows the input block 2 after the operating unit 6 is turned from the position shown in FIG. 7 in the orientation indicated by the arrow A4. The conversion mechanism M1 converts the movement of the operating unit 6 in the second direction D2 (the turn in the orientation indicated by the arrow A4) into the second action of the permanent magnet 31. That is, along with the turn of the operating unit 6 in the second direction D2, the permanent magnet 31 moves in the fourth direction D4. Thus, the second action is a movement involving a change in the distance between the magnetic sensor 41 and the permanent magnet 31. Moreover, in the second action, the relative angle of rotation of the permanent magnet 31 around the rotation axis X1 relative to the magnetic sensor 41 is maintained. Here, "the relative angle of rotation of the permanent magnet 31 around the rotation axis X1 relative to the magnetic sensor 41 is maintained" is not limited to referring to the case where the relative angle of rotation of the permanent magnet 31 around the rotation axis X1 relative to the magnetic sensor 41 does not change at all but refers to also the case where the angle of rotation changes within an allowable error range.

The second action changes the distance between the magnetic sensor 41 and the permanent magnet 31, which changes the strength of the magnetic field applied to the magnetic sensor 41. That is, the magnetic sensor 41 detects the second action as the change in the strength of the magnetic field. The ECU controls, in accordance with the strength of the magnetic field detected by the magnetic sensor 41, the operation of the wipers, nozzles, headlights, turn signals, and the like of a vehicle.

Moreover, from the state shown in FIG. 8, the operating unit 6 is turned in the orientation indicated by the arrow A3, and thereby, the operating unit 6 is returned to the state shown in FIG. 7.

Moreover, from the state shown in FIG. 7, the operating unit 6 is turned in the orientation indicated by the arrow A3, and thereby, the input block 2 gets into the state shown in FIG. 9. From the state shown in FIG. 9, the operating unit 6 is turned in the orientation indicated by the arrow A4, and thereby, the operating unit 6 is returned to the state shown in FIG. 7.

In the state shown in FIG. 9, the distance between the magnetic sensor 41 and the permanent magnet 31 is different from the distances in the state shown in FIG. 7 and the state shown in FIG. 8. Consequently, the strength of the magnetic field detected by the magnetic sensor 41 is different from the strengths in the state shown in FIG. 7 and the state shown in FIG. 8. Thus, when the operating unit 6 moves in the second direction D2, the magnetic sensor 41 can make different outputs corresponding to the two or more positions (angles of rotation) of the operating unit 6. Thus, the movable object 100 is configured to perform switching between two or more variations of control in accordance with the position of the operating unit 6.

For example, the movable object 100 is configured to, when the operating unit 6 moves in the second direction D2, perform switching among three variations of control in accordance with the position of the operating unit 6. That is, the movable object 100 is configured to perform switching among three variations of control in accordance with which of sixth to eighth ranges the strength of a magnetic field detected by the magnetic sensor 41 is within.

As a more specific example, the ECU of the movable object 100 changes the state of the headlights to a low beam state when the strength of a magnetic field detected by the magnetic sensor 41 is within the seventh range (the state shown in FIG. 7). The ECU changes the state of the headlights to a high beam state when the strength of a magnetic field detected by the magnetic sensor 41 is within the sixth range (the state shown in FIG. 8). The ECU changes the state of the headlights to a flashing state (short-time lighting) when the strength of the magnetic field detected by the magnetic sensor 41 is within the eighth range (the state shown in FIG. 9).

As described above, for example, the movable object 100 is configured to, when the operating unit 6 moves in the first direction D1, perform switching among five variations of control in accordance with the position of the operating unit 6. Moreover, for example, the movable object 100 is configured to, when the operating unit 6 moves in the second direction D2, perform switching among three variations of control in accordance with the position of the operating unit 6. However, the variations of control by the movable object 100 in accordance with the movement of the operating unit 6 in the first direction D1 and the variations of control by the movable object 100 in accordance with the movement of the operating unit 6 in the second direction D2 are not limited to five or three variations but may be two, four, or six or more variations. Moreover, the number of the variations of control by the movable object 100 in accordance with the movement of the operating unit 6 in the first direction D1 is preferably larger than or equal to the number of the variations of control by the movable object 100 in accordance with the movement of the operating unit 6 in the second direction D2. This is because when in the input device 1 of the embodiment, the position of the operating unit 6 is detected based on the output from the magnetic sensor 41, the resolution of the change in the position of the operating unit 6 in the first direction D1 is higher than the resolution of the change in the position of the operating unit 6 in the second direction D2.

(4) Brief Summary

As described above, in the input device 1 of the present embodiment, the conversion mechanism M1 converts the movement of the operating unit 6 in the first direction D1 into the first action of the permanent magnet 31 and converts the movement of the operating unit 6 in the second direction D2 into the second action of the permanent magnet 31. Thus, one magnetic sensor 41 can detect the movement of the operating unit 6 in the first direction D1 and the movement of the operating unit 6 in the second direction D2. The input device 1 of the present embodiment in practice includes, per operating unit 6, only one magnetic sensor 41 corresponding to the operating unit 6. Thus, the number of the magnetic sensors is reduced compared to the case where the input device 1 includes, per operating unit 6, a magnetic sensor for detecting the movement of the operating unit 6 in the first direction D1 and a magnetic sensor for detecting the movement of the operating unit 6 in the second direction D2.

Moreover, the input device 1 of the present embodiment includes, per operating unit 6, only one permanent magnet 31 corresponding to the operating unit 6. Thus, the number of the permanent magnets 31 can be reduced compared to the case where the input device 1 includes, per operating unit 6, a plurality of permanent magnets 31 corresponding to the operating unit 6. Note that when a plurality of permanent magnets are collected at one site, the plurality of permanent magnets collected at the one site are deemed as one permanent magnet.

(First Variation)

An input device 1 according to a first variation will be described below. Components similar to those in the embodiment are denoted by the same reference signs as those in the embodiment, and the description thereof will be omitted.

The shape of a guide groove 710 of a click member 71 (see FIG. 3) of the first variation is a curved surface shape. Specifically, the shape of the guide groove 710 is a curved surface shape depressed deeply toward a prescribed position. The shape of the guide groove 710 is, for example, a spherical, spheroidal, or paraboloidal surface shape.

An operating unit 6 moves in the first direction D1 and the second direction D2 so that a click pin 67 moves within the guide groove 710. Moreover, the operating unit 6 is configured to move in the first direction D1 and the second direction D2 at the same time. In other words, the operating unit 6 is configured to move in directions including a vector component in the first direction D1 and a vector component in the second direction D2.

When the operating unit 6 moves in the first direction D1 and the second direction D2 at the same time, a permanent magnet 31 rotates together with a holder 23, and an actuator 5 moves in the left/right direction (the third direction D3) to move the permanent magnet 31 in the fourth direction D4. That is, a conversion mechanism M1 of the first variation is configured to concurrently execute conversion of the movement of the operating unit 6 in the first direction D1 into the first action (rotation) of the permanent magnet 31 and conversion of the movement of the operating unit 6 in the second direction D2 into the second action (movement in the fourth direction D4) of the permanent magnet 31.

The first variation enables the operating unit 6 to move in the first direction D1 and the second direction D2 at the same time and enables a magnetic sensor 41 to detect the movement of the operating unit 6.

(Second Variation)

Figure 12:
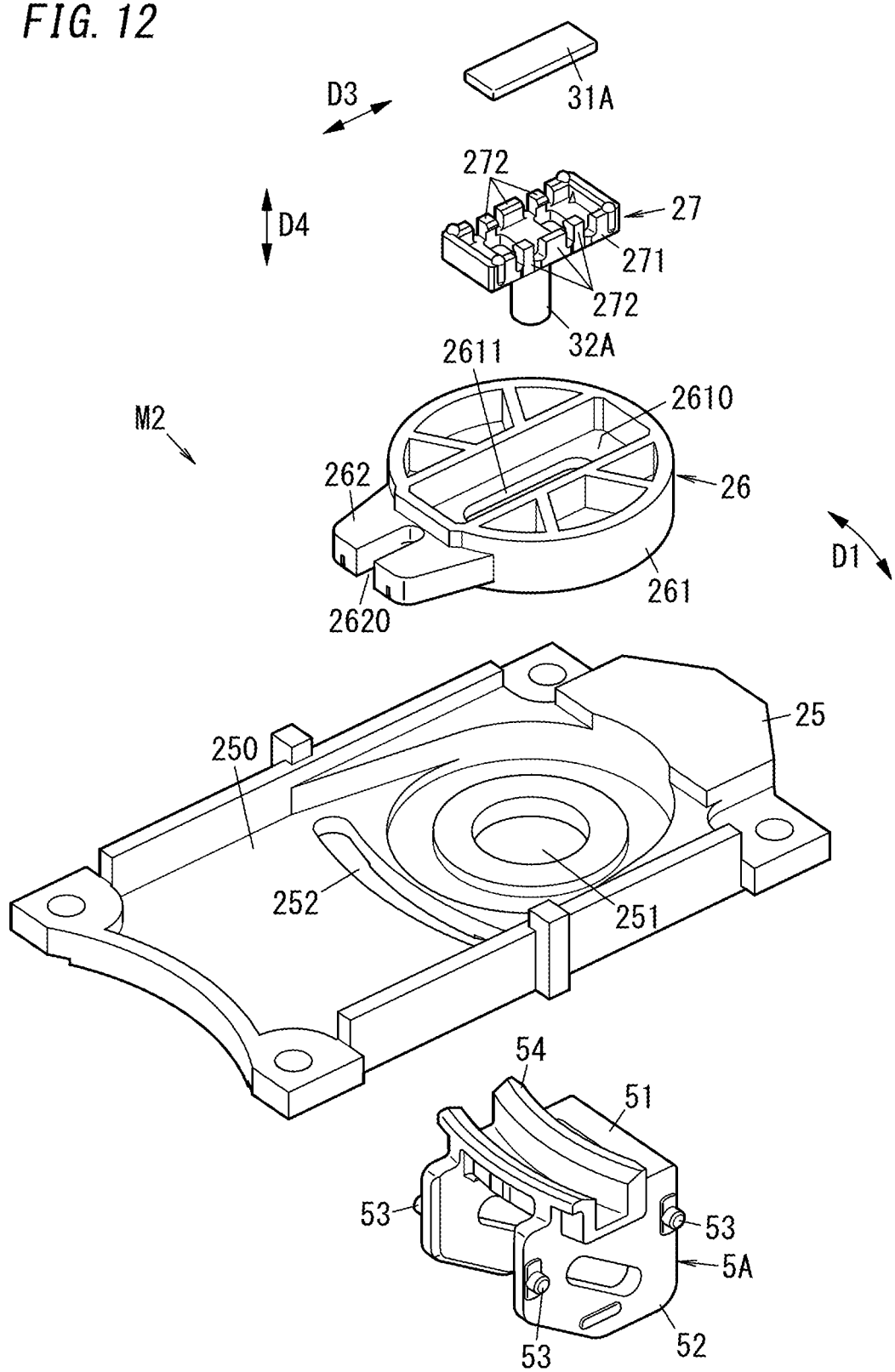
FIG. 12 is an exploded perspective view of a main part of an input device according to a second variation of the embodiment.
Figure 13:
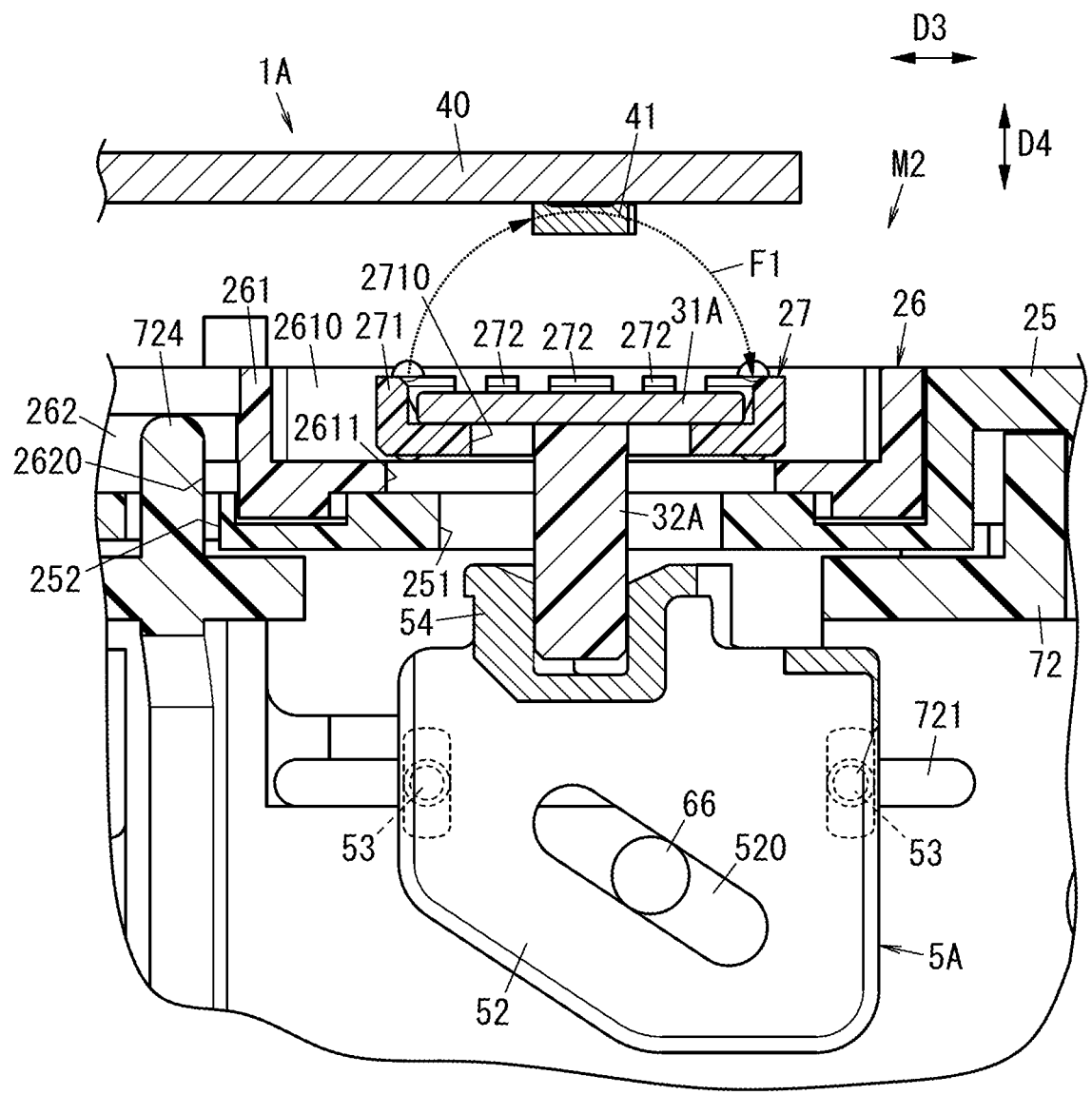
FIG. 13 is a sectional view of the input device of the second variation before being operated.

An input device 1A according to a second variation will be described below with reference to FIGS. 12 to 14. Components similar to those in the embodiment are denoted by the same reference signs as those in the embodiment, and the description thereof will be omitted.

In the input device 1A of the second variation, the structure of a conversion mechanism M2 is different from the structure of the conversion mechanism M1 of the embodiment. The conversion mechanism M2 includes an actuator 5A, a holder cover 25, a holder 26, a slider 27, and a restriction part 32A. The configuration of an operating unit 6 is the same as that in the embodiment. In FIG. 13, components, except for a cam projection 66, of the operating unit 6 are omitted.

The actuator 5A includes a connection section 54 in addition to the components of the actuator 5 of the embodiment. When viewed in a direction in which two side boards 52 are aligned with each other, the connection section 54 has a U-shape. The connection section 54 has a length in the direction in which the two side boards 52 are aligned with each other. The connection section 54 nips the restriction part 32A. In this way, the connection section 54 is connected to the restriction part 32A. In other words, the connection section 54 holds the restriction part 32A. The restriction part 32A is movable on an inner side of the connection section 54 in a length direction of the connection section 54 (in a depth direction with respect to the plane of FIG. 13).

The holder cover 25 has a rectangular plate shape. The holder cover 25 is attached to a sliding body 72. The holder cover 25 has a recess 250. In the recess 250, the holder 26 is disposed. The holder cover 25 has a through hole 251 formed in a bottom surface of the recess 250. The restriction part 32A extends through the through hole 251. Moreover, the holder cover 25 has a through hole 252 in the bottom surface of the recess 250. The sliding body 72 has a shaft part 724 extending through the through hole 252.

The holder 26 includes a body part 261 and an extension part 262. The body part 261 has a disk shape. The body part 261 has a groove 2610 in which the slider 27 is disposed. The longitudinal direction of the groove 2610 is along the third direction D3. The body part 261 has a through hole 2611 formed in a bottom surface of the groove 2610. The restriction part 32A extends through the through hole 2611. The extension part 262 has a trapezoidal plate shape in plan view. The extension part 262 is continuous to the body part 261. The extension part 262 extends from the body part 261 in a radial direction of the body part 261. The extension part 262 has a recess 2620. In the recess 2620, the shaft part 724 of the sliding body 72 is inserted.

The longitudinal direction of the slider 27 is along the third direction D3. In the third direction D3, the length of the slider 27 is shorter than the length of the groove 2610 of the holder 26. The slider 27 includes a housing section 271 and a plurality of (in FIG. 12, six) pawls 272. The housing section 271 has a rectangular parallelepiped shape. The housing section 271 has a through hole 2710. The plurality of pawls 272 protrude from the housing section 271. The plurality of pawls 272, together with a peripheral portion of the through hole 2710 of the housing section 271, nip a permanent magnet 31A. In this way, the slider 27 holds the permanent magnet 31A.

The restriction part 32A has a columnar shape. The restriction part 32A is integrally formed with the slider 27. The restriction part 32A protrudes in the fourth direction D4 from the slider 27 toward the actuator 5A. The restriction part 32A extends from the slider 27 through the through hole 2611 of the holder 26 and the through hole 251 of the holder cover 25 to the location of the connection section 54 of the actuator 5A.

The permanent magnet 31A has a rectangular parallelepiped shape corresponding to the shape of the housing section 271 of the slider 27. The longitudinal direction of the permanent magnet 31A is along the left/right direction (the third direction D3). The direction of the magnetic moment (the direction from the S pole toward the N pole) of the permanent magnet 31A is along the left/right direction (the third direction D3).

Next, an example of the operation of the input device 1A will be described.

The behavior of the operating unit 6 (see FIG. 2) when the operating unit 6 is turned in the first direction D1 is substantially the same as that in the embodiment. That is, when the operating unit 6 is turned in the first direction D1, the sliding body 72 is turned in the first direction D1 relative to a case 73 (see FIG. 2) and the holder cover 25. When the sliding body 72 is turned in the first direction D1, the holder 26 is pulled by the shaft part 724 of the sliding body 72 inserted in the recess 2620 and thus rotates in the first direction D1 relative to the holder cover 25. That is, the holder 26 rotates in the interior of the recess 250 of the holder cover 25. Along with the rotation of the holder 26 in the first direction D1, the slider 27 held by the holder 26 and the permanent magnet 31A held by the slider 27 rotate in the first direction D1. In sum, when the operating unit 6 is turned in the first direction D1 relative to the case 73 and the holder cover 25, the sliding body 72, the holder 26, the slider 27, and the permanent magnet 31A together rotate relative to the case 73 and the holder cover 25. That is, the movement of the operating unit 6 in the first direction D1 is converted into the first action of the permanent magnet 31A. The first action changes the relative angle of rotation of the permanent magnet 31A around a rotation axis X1 (see FIG. 5) relative to a magnetic sensor 41. Thus, the orientation of the magnetic field detected by the magnetic sensor 41 changes. The magnetic sensor 41 detects the first action as the change in the orientation of the magnetic field.

In contrast, when the operating unit 6 is turned in the second direction D2 (see FIG. 7), the actuator 5A moves in the third direction D3 in a similar manner to the embodiment. Along with the movement of the actuator 5A, the restriction part 32A held by the actuator 5A, the slider 27 coupled to the restriction part 32A, and the permanent magnet 31A held by the slider 27 move in the third direction D3. More specifically, the slider 27 slides and moves in the third direction D3 in the interior of the groove 2610 of the holder 26. The movement of the slider 27 and the permanent magnet 31A is a linear movement (linear motion). FIG. 13 shows the conversion mechanism M2 when the operating unit 6 is located at the center of a range within which the operating unit 6 can be turned. The position of the operating unit 6 in FIG. 13 is the same as the position of the operating unit 6 in FIG. 7. In FIG. 13, the permanent magnet 31A and the magnetic sensor 41 are aligned with each other in the fourth direction D4. FIG. 14 shows the conversion mechanism M2 after the operating unit 6 is turned from the position shown in FIG. 13 in the orientation indicated by the arrow A4 (see FIG. 7). When the conversion mechanism M2 changes from the state shown in FIG. 13 to the state shown in FIG. 14, the actuator 5A, the slider 27, and the permanent magnet 31A move to the right on the plane of the figure. In contrast, when the operating unit 6 is turned from the position shown in FIG. 13 in the orientation indicated by the arrow A3 (see FIG. 7), the actuator 5A, the slider 27, and the permanent magnet 31A move to the left on the plane of the figure.

As described above, the movement of the operating unit 6 in the second direction D2 is converted into the second action of the permanent magnet 31A. The second action changes the positional relationship between the magnetic sensor 41 and the permanent magnet 31A. Moreover, the second action is a movement involving a change in the distance between the magnetic sensor 41 and the permanent magnet 31A. In FIGS. 13 and 14, a magnetic field line F1 of a magnetic field produced by the permanent magnet 31A is partially shown. Changing the positional relationship between the magnetic sensor 41 and the permanent magnet 31A results in a change in the strength of the magnetic field applied to the magnetic sensor 41. The magnetic sensor 41 detects the second action as the change in the strength of the magnetic field As described in the second variation above, the magnetic sensor 41 can detect the first action and the second action of the operating unit 6 also in the case of the configuration that the permanent magnet 31A moves in the third direction D3 along with the turn of the operating unit 6 in the second direction D2.

(Other Variations of Embodiment)

Other variations of the embodiment will be described below. The variations described below may be accordingly combined with each other. Moreover, the variations described below may be accordingly combined with the variations described above.

The number of the Hall elements 411 included in the magnetic sensor 41 is not limited to four, but one to three Hall element(s) or five or more Hall elements may be included. When the number of Hall elements 411 included in the magnetic sensor 41 is one to three, for example, a 3D Hall element described later may be used as the Hall element 411.

The magnetic sensor 41 is not limited to a sensor including at least one Hall element 411 but may be a sensor including Magneto Resistive Sensor (MR element) or coil for detecting a magnetic field.

The magnetic sensor 41 may be a sensor including a 3-dimension (3D) Hall element. The 3D Hall element is an element including a Hall element for measuring a magnetic field in the X-axis direction, a Hall element for measuring a magnetic field in the Y-axis direction, and a Hall element for measuring a magnetic field in the Z-axis direction which are arranged on one chip.

In place of the permanent magnet 31 which moves relative to the magnetic sensor 41, the magnetic sensor 41 may be configured to move relative to the permanent magnet 31. That is, of the permanent magnet 31 and the magnetic sensor 41, the magnetic sensor 41 may be a movable member. For example, the arrangement of the permanent magnet 31 and the arrangement of the magnetic sensor 41 in the embodiment are replaced with each other, thereby implementing the input device 1 including the magnetic sensor 41 which serves as a movable member.

The number of each of the permanent magnet 31, the magnetic sensor 41, and the operating unit 6 is not limited to two but may be one or three or more. Preferably, the same number of the permanent magnets 31, the magnetic sensors 41, and the operating units 6 are provided.

The operation of converting, by the conversion mechanism M1, the movement of the operating unit 6 in the first direction D1 into the first action of the permanent magnet 31 is not limited to the operation of converting the turn of the operating unit 6 in the first direction D1 into the rotation of the permanent magnet 31 in the first direction D1 as in the case of the embodiment. The conversion mechanism M1 may convert the turn of the operating unit 6 in the first direction D1 into the rotation of the permanent magnet 31 in a prescribed direction via, for example, a cam or a gear. The prescribed direction is a direction different from the first direction D1. Moreover, the conversion mechanism M1 may convert the turn of the operating unit 6 in the first direction D1 into the rotation of the permanent magnet 31 in the first direction D1 via a cam or a gear.

Moreover, the displacement of the angle of rotation of the operating unit 6 when the operating unit 6 is turned in the first direction D1 and the displacement of the angle of rotation of the permanent magnet 31 along with the first action may be the same magnitude or may be different magnitudes depending on the conversion mechanism M1.

Moreover, the movement of the operating unit 6 in the first direction D1 is not limited to the turn but may be, for example, a linear movement. That is, the conversion mechanism M1 may convert the linear movement of the operating unit 6 in the first direction D1 into the rotation of the permanent magnet 31 in a prescribed direction via, for example, a cam or a gear.

Moreover, the operation of converting, by the conversion mechanism M1, the movement of the operating unit 6 in the second direction D2 into the second action of the permanent magnet 31 is not limited to the operation of converting the turn of the operating unit 6 in the second direction D2 via the actuator 5 into a movement (operation of linear motion) of the permanent magnet 31 in the fourth direction D4 as in the case of the embodiment. The conversion mechanism M1 may convert the turn of the operating unit 6 in the second direction D2 into a movement (operation of linear motion) of the permanent magnet 31 in the fourth direction D4 via, for example, a cam or a gear.

Moreover, the movement of the operating unit 6 in the second direction D2 is not limited to the turn but may be, for example, a linear movement. That is, the conversion mechanism M1 may convert the linear movement of the operating unit 6 in the second direction D2 into a movement of the permanent magnet 31 in the fourth direction D4 via, for example, the actuator 5, a cam, or a gear.

Moreover, the movement of the permanent magnet 31 in the fourth direction D4 is not limited to the operation of linear motion but may be, for example, a rotation movement.

Moreover, in the embodiment, the direction of the movement of the permanent magnet 31 is the fourth direction D4, and in the second variation, the direction of the movement of the permanent magnet 31A is the third direction D3, but the direction of the movement of each of the permanent magnets 31 and 31A is not limited to these directions. For example, the direction of the movement of each of the permanent magnet 31 and 31A may be a direction oblique to the fourth direction D4 or the third direction D3.

The restriction part 32 does not have to be integrally formed with the permanent magnet 31. For example, the restriction part 32 may be formed as a member separated from the permanent magnet 31 and may be sandwiched between the permanent magnet 31 and the actuator 5.

Moreover, the permanent magnet 31 and the tilted surface 510 of the actuator 5 may be brought into contact with each other, and part of the permanent magnet 31 including a contact part with the tilted surface 510 may function as the restriction part 32.

Moreover, the permanent magnet 31 has a disk shape, and the permanent magnet 31A has a rectangular parallelepiped shape, but the shapes of the permanent magnets 31 and 31A are not limited to these shapes and may be selected from a variety of shapes including, for example, a substantially rhombic shape.

Control according to the output of the magnetic sensor 41 is not limited to being executed by the ECU but may be executed by an appropriate control device. The control device includes: a memory storing a program for performing control according to, for example, the output of the magnetic sensor 41; a processor for executing the program; and the like. The control device may, but does not have to, be included in components of the input device 1 or the movable object 100.

The movable object 100 of the embodiment is a four-wheeled automobile, but the movable object 100 is not limited to the four-wheel automobile. The movable object 100 may be a two-wheel automobile, a three-wheel automobile, or the like. Moreover, the movable object 100 may be, for example, a forklift, a ship, an aircraft, a bicycle, or a handle-type electric wheelchair. Further, the input device 1 may be included in an object other than the movable object 100.

(Summary)

The embodiment and the like described above disclose the following aspects.

An input device (1, 1A) of a first aspect includes a permanent magnet (31, 31A), a magnetic sensor (41), an operating unit (6), and a conversion mechanism (M1, M2). The magnetic sensor (41) is configured to detect a magnetic field produced by the permanent magnet (31, 31A). The conversion mechanism (M1, M2) is configured to convert a movement of the operating unit (6) into a movement of a movable member which is one of the permanent magnet (31, 31A) or the magnetic sensor (41) relative to the other of the permanent magnet (31, 31A) or the magnetic sensor (41). The magnetic sensor (41) is configured to output a signal according to a relative angle of rotation of the permanent magnet (31, 31A) around a rotation axis (X1) relative to the magnetic sensor (41) and strength of a magnetic field applied to the magnetic sensor (41). The conversion mechanism (M1, M2) is configured to convert a movement of the operating unit (6) in a first direction (D1) into a first action of the movable member and convert a movement of the operating unit (6) in a second direction (D2) into a second action of the movable member. The second direction (D2) is a direction intersecting the first direction (D1). The first action is a movement involving a change in the relative angle of rotation of the permanent magnet (31, 31A) around the rotation axis (X1) relative to the magnetic sensor (41). The second action is a movement involving a change in the strength of the magnetic field applied to the magnetic sensor (41).

With this configuration, the conversion mechanism (M1, M2) realizes the first action of the movable member in accordance with the movement of the operating unit (6) in the first direction (D1) and realizes the second action of the movable member in accordance with the movement of the operating unit (6) in the second direction (D2). This enables the magnetic sensor (41) to: output a signal according to the first action when the operating unit (6) moves in the first direction (D1); and output a signal according to the second action when the operating unit (6) moves in the second direction (D2). Thus, the number of the magnetic sensors (41) is reduced compared to the case where the input device (1, 1A) includes a magnetic sensor (41) for detecting the movement of the operating unit (6) in the first direction (D1) and a magnetic sensor (41) for detecting the movement of the operating unit (6) in the second direction (D2).

In an input device (1, 1A) of a second aspect referring to the first aspect, the movable member is the permanent magnet (31, 31A).

With this configuration, wiring (a conductor) to be connected to the magnetic sensor (41) is easily arranged, compared to the case where the movable member is the magnetic sensor (41).

An input device (1, 1A) of a third aspect referring to the second aspect further includes a substrate (40), a first body (11), and a second body (12). The magnetic sensor (41) is mounted on the substrate (40). The first body (11) is disposed on a same side of the magnetic sensor (41) with respect to a location of the permanent magnet (31, 31A). The second body (12) is coupled to the first body (11). The second body (12) is disposed on an opposite side of the magnetic sensor (41) with respect to the location of the permanent magnet (31, 31A). The substrate (40) is held by the first body (11).

With this configuration, an installation space for the substrate (40) can be secured.

In an input device (1, 1A) of a fourth aspect referring to any one of the first to third aspects, the operating unit (6) includes a lever (61).

With this configuration, an operator easily operates the operating unit (6) by holding the lever (61).

In an input device (1, 1A) of a fifth aspect referring to any one of the first to fourth aspects, the conversion mechanism (M1, M2) is configured to perform at the same time conversion of the movement of the operating unit (6) in the first direction (D1) into the first action of the movable member and conversion of the movement of the operating unit (6) in the second direction (D2) into the second action of the movable member.

This configuration improves the convenience of the input device (1, 1A) compared to the case where the conversion mechanism (M1, M2) cannot perform the two conversions at the same time.

In an input device (1, 1A) of a sixth aspect referring to any one of the first to fifth aspects, the magnetic sensor (41) includes at least one Hall element (411).

With this configuration, the function of the magnetic sensor (41) is easily implemented.

An input device (1) of a seventh aspect referring to any one of the first to sixth aspects further includes an elastic part (21). The elastic part (21) is configured to apply force to the movable member along a direction (a fourth direction (D4)) in which the movable member moves along with the second action.

With this configuration, positional variations of the movable member can be reduced. Thus, the detection accuracy of the magnetic sensor (41) can be improved.

In an input device (1) of an eighth aspect referring to any one of the first to seventh aspects, the conversion mechanism (M1) includes an actuator (5) and a restriction part (32). The actuator (5) has a tilted surface (510). The tilted surface (510) is tilted relative to a flat surface orthogonal to a direction (a fourth direction (D4)) in which the movable member moves along with the second action. The restriction part (32) is configured to restrict a distance between the movable member and the tilted surface (510). The actuator (5) is configured to move, in accordance with the movement of the operating unit (6) in the second direction (D2), such that a position of the restriction part (32) on the tilted surface (510) is changed to realize the second action of the movable member.

With this configuration, the second action is realized by a simple configuration.

In an input device (1, 1A) of a ninth aspect referring to any one of the first to eighth aspects, the conversion mechanism (M1, M2) includes a holder (23, 26). The holder (23, 26) holds the movable member. The holder (23, 26) is configured to rotate together with the movable member in accordance with the movement of the operating unit (6) in the first direction (D1) to realize the first action of the movable member.

With this configuration, the first action is realized by a simple configuration.

In an input device (1, 1A) of a tenth aspect referring to the ninth aspect, the conversion mechanism (M1, M2) is configured to move, in accordance with a movement of the operating unit (6) in the second direction (D2), the movable member relative to the holder (23, 26) to realize the second action of the movable member.

With this configuration, the second action is realized by a simple configuration.

An input device (1, 1A) of an eleventh aspect referring to any one of the first to tenth aspects further includes at least one detection block (input block (2)). One of the at least one detection block includes the permanent magnet (31, 31A) including only one permanent magnet (31, 31A). The detection block includes the magnetic sensor (41) including only one magnetic sensor (41) and configured to detect the magnetic field of the one permanent magnet (31, 31A).

With this configuration, the input device (1, 1A) has a reduced number of permanent magnets (31, 31A).

In an input device (1, 1A) of a twelfth aspect referring to any one of the first to eleventh aspects, the second action is a movement involving a change in the distance between the magnetic sensor (41) and the permanent magnet (31, 31A).

With this configuration, a change in the strength of the magnetic field applied to the magnetic sensor (41) in the second action is detectable with increased accuracy.

The configurations except for the configuration of the first aspect are not configurations essential for the input device (1, 1A) and may accordingly be omitted.

A movable object (100) according to a thirteenth aspect includes the input device (1, 1A) according to any one of the first to twelfth aspects, and a movable object body (101). The input device (1, 1A) is mounted on the movable object body (101).

With this configuration, the number of the magnetic sensors (41) is reduced.

While various embodiments have been described herein above, it is to be appreciated that various changes in form and detail may be made without departing from the spirit and scope of the present disclosure presently or hereafter claimed.

CROSS-REFERENCE TO RELATED APPLICATIONS

The present application is a Bypass Continuation of International Application No. PCT/JP2021/053980 filed on Aug. 3, 2020, which is based upon and claims the benefit of priority to Japanese Patent Application No. 2019-170753, filed on Sep. 19, 2019, the entire contents of both applications are incorporated herein by reference.

The invention claimed is:

1. An input device comprising:
a permanent magnet;
a magnetic sensor configured to detect a magnetic field produced by the permanent magnet;
an operating unit; and
a conversion mechanism configured to convert a movement of the operating unit into a movement of a movable member which is one of the permanent magnet or the magnetic sensor relative to the other of the permanent magnet or the magnetic sensor, wherein
the magnetic sensor is configured to output a signal according to a relative angle of rotation of the permanent magnet around a rotation axis relative to the magnetic sensor and strength of a magnetic field applied to the magnetic sensor,
the conversion mechanism is configured to convert a movement of the operating unit in a first direction into a first action of the movable member and convert a movement of the operating unit in a second direction into a second action of the movable member, the second direction intersecting the first direction,
the first action is a movement involving a change in the relative angle of rotation of the permanent magnet around the rotation axis relative to the magnetic sensor,
the second action is a movement involving a change in the strength of the magnetic field applied to the magnetic sensor,
the conversion mechanism includes a holder holding the movable member,
the holder is configured to rotate together with the movable member in accordance with the movement of the operating unit in the first direction to realize the first action of the movable member, and
the conversion mechanism is configured to move, in accordance with a movement of the operating unit in the second direction, the movable member relative to the holder to realize the second action of the movable member.

2. The input device of claim 1, wherein
the movable member is the permanent magnet.

3. The input device of claim 2, further comprising:
a substrate on which the magnetic sensor is mounted;
a first body disposed on a same side of the magnetic sensor with respect to a location of the permanent magnet; and
a second body coupled to the first body, the second body being disposed on an opposite side of the magnetic sensor with respect to the location of the permanent magnet, wherein
the substrate is held by the first body.

4. The input device of claim 1, wherein
the operating unit has a lever.

5. The input device of claim 1, wherein
the conversion mechanism is configured to perform at the same time conversion of the movement of the operating unit in the first direction into the first action of the movable member and conversion of the movement of the operating unit in the second direction into the second action of the movable member.

6. The input device of claim 1, wherein
the magnetic sensor includes at least one Hall element.

7. The input device of claim 1, further comprising
an elastic part configured to apply force to the movable member along a direction in which the movable member moves along with the second action.

8. The input device of claim 1, wherein
the conversion mechanism includes
an actuator having a tilted surface tilted relative to a flat surface orthogonal to a direction in which the movable member moves along with the second action, and
a restriction part configured to restrict a distance between the movable member and the tilted surface, and
the actuator is configured to move, in accordance with the movement of the operating unit in the second direction, such that a position of the restriction part on the tilted surface is changed to realize the second action of the movable member.

9. The input device of claim 1, wherein
the conversion mechanism includes
an actuator including a connection section,
a slider holding the movable member, and a restriction part to which the slider is coupled and which is held by the connection section, and the actuator is configured to, when the operating unit moves in the second direction, move, together with the restriction part, the slider, and the movable member, along a longitudinal direction of the permanent magnet to realize the second action of the movable member.

10. The input device of claim 1, wherein
the conversion mechanism includes
an actuator including a connection section,
a slider holding the movable member, and
a restriction part to which the slider is coupled and which is held by the connection section, and
the actuator is configured to, when the operating unit moves in the second direction, move, together with the restriction part, the slider, and the movable member, along a direction of a magnetic moment of the permanent magnet to realize the second action of the movable member.

11. The input device of claim 1, further comprising
at least one detection block, wherein
one of the at least one detection block includes
the permanent magnet including only one permanent magnet and
the magnetic sensor including only one magnetic sensor and configured to detect the magnetic field of the one permanent magnet.

12. The input device of claim 1, wherein
the second action is a movement involving a change in a distance between the magnetic sensor and the permanent magnet.

13. A movable object comprising:
an input device including:
a permanent magnet;
a magnetic sensor configured to detect a magnetic field produced by the permanent magnet;
an operating unit; and
a conversion mechanism configured to convert a movement of the operating unit into a movement of a movable member which is one of the permanent magnet or the magnetic sensor relative to the other of the permanent magnet or the magnetic sensor, wherein the magnetic sensor is configured to output a signal according to a relative angle of rotation of the permanent magnet around a rotation axis relative to the magnetic sensor and strength of a magnetic field applied to the magnetic sensor, the conversion mechanism is configured to convert a movement of the operating unit in a first direction into a first action of the movable member and convert a movement of the operating unit in a second direction into a second action of the movable member, the second direction intersecting the first direction, the first action is a movement involving a change in the relative angle of rotation of the permanent magnet around the rotation axis relative to the magnetic sensor, the second action is a movement involving a change in the strength of the magnetic field applied to the magnetic sensor, the conversion mechanism includes a holder holding the movable member, the holder is configured to rotate together with the movable member in accordance with the movement of the operating unit in the first direction to realize the first action of the movable member, and the conversion mechanism is configured to move, in accordance with a movement of the operating unit in the second direction, the movable member relative to the holder to realize the second action of the movable member; and a movable object body on which the input device is mounted.

* * * * *